US008622804B2

(12) United States Patent
Okada

(10) Patent No.: US 8,622,804 B2
(45) Date of Patent: Jan. 7, 2014

(54) GAMING MACHINE WHICH IS EXECUTABLE RESCUE PROCESS IN RESPONSE TO INSURANCE BET AND GAMING METHOD THEREOF

(75) Inventor: Kazuo Okada, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 462 days.

(21) Appl. No.: 12/784,206

(22) Filed: May 20, 2010

(65) Prior Publication Data

US 2010/0304834 A1 Dec. 2, 2010

(51) Int. Cl.
*G06F 17/00* (2006.01)

(52) U.S. Cl.
USPC ............................................ 463/20; 463/16

(58) Field of Classification Search
USPC .................................................. 463/16-21
See application file for complete search history.

(56) References Cited

U.S. PATENT DOCUMENTS

| | | | |
|---|---|---|---|
| 4,283,709 | A | 8/1981 | Lucero et al. |
| 4,624,459 | A | 11/1986 | Kaufman |
| 4,669,731 | A | 6/1987 | Clarke |
| 4,837,728 | A | 6/1989 | Barrie et al. |
| 4,964,638 | A | 10/1990 | Ishida |
| 5,178,390 | A | 1/1993 | Okada |
| 5,280,909 | A | 1/1994 | Tracy |
| 5,564,700 | A | 10/1996 | Celona |
| 5,611,730 | A | 3/1997 | Weiss |
| 5,639,088 | A | 6/1997 | Schneider et al. |
| 5,695,402 | A | 12/1997 | Stupak |
| 5,702,303 | A | 12/1997 | Takemoto et al. |
| 5,770,533 | A | 6/1998 | Franchi |
| 5,820,459 | A | 10/1998 | Acres et al. |
| 5,836,817 | A | 11/1998 | Acres et al. |
| 5,890,963 | A | 4/1999 | Yen |
| 5,910,048 | A | 6/1999 | Feinberg |
| 6,001,016 | A | 12/1999 | Walker et al. |
| 6,003,013 | A | 12/1999 | Boushy et al. |
| 6,089,980 | A | 7/2000 | Gauselmann |

(Continued)

FOREIGN PATENT DOCUMENTS

| | | | |
|---|---|---|---|
| DE | 32 42 890 | A1 | 5/1984 |
| DE | 37 12 841 | A1 | 11/1988 |

(Continued)

OTHER PUBLICATIONS

U.S. Appl. No. 61/099,682, specification, filed Sep. 24, 2008.*

*Primary Examiner* — Michael Cuff
(74) *Attorney, Agent, or Firm* — KMF Patent Services, PLLC; S. Peter Konzel; Kenneth M. Fagin

(57) ABSTRACT

A gaming machine runs a base game in which symbols 501 are rearranged and a base payout is awarded according to the rearranged symbols 501, when a game value is bet, runs a bonus game in which the symbols 501 are rearranged with a higher payout rate than that of the game and a bonus payout is awarded according to the rearranged symbols 501, if the symbols 501 are rearranged in a predetermined condition in the base game, makes an insurance bet by using at least a part of the bonus payout awarded in the bonus game, determines whether a rescue start condition is established, if the insurance bet has been made, and performs a rescue process if the rescue start condition has been established.

10 Claims, 33 Drawing Sheets

(56) References Cited

U.S. PATENT DOCUMENTS

| | | | | |
|---|---|---|---|---|
| 6,224,482 | B1 | 5/2001 | Bennett | |
| 6,234,896 | B1 | 5/2001 | Walker et al. | |
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,604,999 | B2 | 8/2003 | Ainsworth | |
| 6,695,697 | B1 | 2/2004 | Okada | |
| 6,932,704 | B2 | 8/2005 | Walker et al. | |
| 6,932,707 | B2 | 8/2005 | Duhamel | |
| 7,568,973 | B2 * | 8/2009 | Iddings et al. | 463/25 |
| 7,871,323 | B2 * | 1/2011 | Walker et al. | 463/16 |
| 7,887,410 | B2 * | 2/2011 | Okada | 463/20 |
| 7,976,383 | B2 * | 7/2011 | Fujimoto et al. | 463/25 |
| 2002/0065124 | A1 | 5/2002 | Ainsworth | |
| 2003/0069073 | A1 | 4/2003 | Okada | |
| 2004/0053676 | A1 | 3/2004 | Rodgers | |
| 2006/0025207 | A1 * | 2/2006 | Walker et al. | 463/25 |
| 2007/0060250 | A1 | 3/2007 | Okada et al. | |
| 2007/0060277 | A1 | 3/2007 | Okada | |
| 2007/0060278 | A1 | 3/2007 | Okada | |
| 2007/0060279 | A1 | 3/2007 | Okada et al. | |
| 2007/0060280 | A1 | 3/2007 | Okada | |
| 2007/0060281 | A1 | 3/2007 | Okada et al. | |
| 2007/0060282 | A1 | 3/2007 | Okada et al. | |
| 2007/0060283 | A1 | 3/2007 | Okada | |
| 2007/0060324 | A1 | 3/2007 | Okada | |
| 2007/0293308 | A1 * | 12/2007 | Jackson et al. | 463/25 |
| 2008/0248867 | A1 * | 10/2008 | Englman et al. | 463/25 |
| 2009/0227376 | A1 * | 9/2009 | Oomori | 463/41 |
| 2009/0325676 | A1 * | 12/2009 | Inamura | 463/20 |
| 2010/0075743 | A1 * | 3/2010 | Yoshizawa | 463/20 |

FOREIGN PATENT DOCUMENTS

| | | | |
|---|---|---|---|
| DE | 41 37 010 | A1 | 8/1992 |
| DE | 100 49 444 | A1 | 11/2001 |
| EP | 0 631 798 | A1 | 1/1995 |
| EP | 1 192 975 | A1 | 4/2002 |
| EP | 1 302 914 | A2 | 4/2003 |
| EP | 1 351 180 | A2 | 10/2003 |
| EP | 1 477 947 | A2 | 11/2004 |
| EP | 1 544 811 | A2 | 6/2005 |
| GB | 2 326 830 | A | 1/1999 |
| WO | WO 03/083795 | A1 | 10/2003 |
| WO | WO 2004/095383 | A1 | 11/2004 |
| WO | 2007/026396 | A1 | 3/2007 |
| WO | 2007/026399 | A1 | 3/2007 |
| WO | 2007/026400 | A1 | 3/2007 |
| WO | 2007/026401 | A1 | 3/2007 |
| WO | 2007/026402 | A1 | 3/2007 |
| WO | 2007/026403 | A1 | 3/2007 |
| WO | 2007/026404 | A1 | 3/2007 |
| WO | 2007/026406 | A1 | 3/2007 |
| WO | 2007/026407 | A1 | 3/2007 |

* cited by examiner

FIG. 6

BASE GAME SYMBOL TABLE

| | | FIRST COLUMN(L1) | SECOND COLUMN(L2) | THIRD COLUMN(L3) | FOURTH COLUMN(L4) | FIFTH COLUMN(L5) |
|---|---|---|---|---|---|---|
| CODE NO. | RANDOM NUMBER | SYMBOL | SYMBOL | SYMBOL | SYMBOL | SYMBOL |
| 0 | 0-3277 | J | WILD | A | Q | J |
| 1 | 3278-6555 | Q | A | J | J | A |
| 2 | 6556-9833 | BAT | Q | BAT | BAT | BAT |
| 3 | 9834-13111 | J | HAMMER | SWORD | Q | J |
| 4 | 13112-16389 | Q | SWORD | RHINOCEROS | K | A |
| 5 | 16390-19667 | RHINOCEROS | WILD | BAT | BAT | BUFFALO |
| 6 | 19668-22945 | A | BUFFALO | FEATURE | A | RHINOCEROS |
| 7 | 22946-26223 | DEER | DEER | A | K | FEATURE |
| 8 | 26224-29501 | SWORD | K | J | HAMMER | K |
| 9 | 29502-32779 | HAMMER | RHINOCEROS | HAMMER | Q | HAMMER |
| 10 | 32780-36057 | A | WILD | A | DEER | Q |
| 11 | 36058-39335 | Q | A | Q | SWORD | BAT |
| 12 | 39336-42613 | SWORD | HAMMER | DEER | FEATURE | K |
| 13 | 42614-45891 | RHINOCEROS | DEER | K | K | DEER |
| 14 | 45892-49169 | K | J | BUFFALO | SWORD | SWORD |
| 15 | 49170-52447 | A | SWORD | Q | DEER | J |
| 16 | 52448-55725 | HAMMER | SWORD | FEATURE | A | WILD |
| 17 | 55726-59003 | J | BAT | A | HAMMER | HAMMER |
| 18 | 59004-62281 | Q | WILD | HAMMER | BUFFALO | SWORD |
| 19 | 62282-65535 | BUFFALO | FEATURE | SWORD | RHINOCEROS | Q |

RANGE OF RANDOM NUMBERS: 0-65535

FIG. 7

BONUS GAME SYMBOL TABLE

| | | FIRST COLUMN(L1) |
|---|---|---|
| CODE NO. | RANDOM NUMBER | SYMBOL |
| 0 | 0-2184 | J |
| 1 | 2185-4369 | Q |
| 2 | 4370-6553 | BAT |
| 3 | 6554-8737 | WILD |
| 4 | 8738-10921 | J |
| 5 | 10922-13105 | Q |
| 6 | 13106-15289 | RHINOCEROS |
| 7 | 15290-17473 | WILD |
| 8 | 17474-19657 | A |
| 9 | 18658-21841 | DEER |
| 10 | 21842-24025 | WILD |
| 11 | 24026-26209 | SWORD |
| 12 | 26210-28393 | HAMMER |
| 13 | 28394-30577 | A |
| 14 | 30578-32761 | WILD |
| 15 | 32762-34945 | Q |
| 16 | 34946-37129 | SWORD |
| 17 | 37130-39313 | WILD |
| 18 | 39314-41497 | RHINOCEROS |
| 19 | 41498-43681 | K |
| 20 | 43682-45865 | A |
| 21 | 45866-48049 | WILD |
| 22 | 48050-50233 | HAMMER |
| 23 | 50234-52417 | J |
| 24 | 52418-54601 | WILD |
| 25 | 54602-56785 | Q |
| 26 | 56786-58969 | WILD |
| 27 | 58970-61153 | WILD |
| 28 | 61154-63337 | BUFFALO |
| 29 | 63338-65535 | WILD |

---

| | | FIFTH COLUMN(L5) |
|---|---|---|
| CODE NO. | RANDOM NUMBER | SYMBOL |
| 0 | 0-2184 | WILD |
| 1 | 2185-4369 | J |
| 2 | 4370-6553 | A |
| 3 | 6554-8737 | WILD |
| 4 | 8738-10921 | WILD |
| 5 | 10922-13105 | BAT |
| 6 | 13106-15289 | J |
| 7 | 15290-17473 | A |
| 8 | 17474-19657 | BUFFALO |
| 9 | 18658-21841 | WILD |
| 10 | 21842-24025 | RHINOCEROS |
| 11 | 24026-26209 | FEATURE |
| 12 | 26210-28393 | K |
| 13 | 28394-30577 | WILD |
| 14 | 30578-32761 | WILD |
| 15 | 32762-34945 | WILD |
| 16 | 34946-37129 | HAMMER |
| 17 | 37130-39313 | Q |
| 18 | 39314-41497 | BAT |
| 19 | 41498-43681 | K |
| 20 | 43682-45865 | WILD |
| 21 | 45866-48049 | DEER |
| 22 | 48050-50233 | SWORD |
| 23 | 50234-52417 | J |
| 24 | 52418-54601 | WILD |
| 25 | 54602-56785 | WILD |
| 26 | 56786-58969 | HAMMER |
| 27 | 58970-61153 | SWORD |
| 28 | 61154-63337 | Q |
| 29 | 63338-65535 | WILD |

RANGE OF RANDOM NUMBERS:0-65535

FIG. 8

BONUS GAME SYMBOL TABLE

| | | FIRST COLUMN(L1) |
|---|---|---|
| CODE NO. | RANDOM NUMBER | SYMBOL |
| 0 | 0-1872 | J |
| 1 | 1873-3744 | Q |
| 2 | 3745-5656 | BAT |
| 3 | 5657-7488 | WILD |
| 4 | 7489-9360 | J |
| 5 | 9361-11232 | Q |
| 6 | 11233-13104 | RHINOCEROS |
| 7 | 13105-14976 | WILD |
| 8 | 14977-16848 | A |
| 9 | 16849-18720 | DEER |
| 10 | 18721-20592 | WILD |
| 11 | 20593-22464 | FEATURE |
| 12 | 22465-24336 | SWORD |
| 13 | 24337-26209 | HAMMER |
| 14 | 26210-28080 | A |
| 15 | 28081-29952 | WILD |
| 16 | 29953-31824 | Q |
| 17 | 31825-33696 | FEATURE |
| 18 | 33697-35568 | SWORD |
| 19 | 35569-37440 | WILD |
| 20 | 377441-39312 | RHINOCEROS |
| 21 | 39313-41184 | K |
| 22 | 41185-43056 | A |
| 23 | 43057-44928 | WILD |
| 24 | 44929-46800 | FEATURE |
| 25 | 46801-48672 | HAMMER |
| 26 | 48673-50544 | J |
| 27 | 50545-52416 | WILD |
| 28 | 52417-54288 | Q |
| 29 | 54289-56160 | WILD |
| 30 | 56161-58032 | WILD |
| 31 | 58033-59904 | BUFFALO |
| 32 | 59905-61777 | WILD |
| 33 | 61778-63648 | FEATURE |
| 34 | 63649-65535 | FEATURE |

• • •

| | | FIFTH COLUMN(L5) |
|---|---|---|
| CODE NO. | RANDOM NUMBER | SYMBOL |
| 0 | 0-2184 | WILD |
| 1 | 2185-4369 | J |
| 2 | 4370-6553 | A |
| 3 | 6554-8737 | WILD |
| 4 | 8738-10921 | WILD |
| 5 | 10922-13105 | BAT |
| 6 | 13106-15289 | J |
| 7 | 15290-17473 | A |
| 8 | 17474-19657 | BUFFALO |
| 9 | 18658-21841 | WILD |
| 10 | 21842-24025 | RHINOCEROS |
| 11 | 24026-26209 | FEATURE |
| 12 | 26210-28393 | K |
| 13 | 28394-30577 | WILD |
| 14 | 30578-32761 | WILD |
| 15 | 32762-34945 | WILD |
| 16 | 34946-37129 | HAMMER |
| 17 | 37130-39313 | Q |
| 18 | 39314-41497 | BAT |
| 19 | 41498-43681 | K |
| 20 | 43682-45865 | WILD |
| 21 | 45866-48049 | DEER |
| 22 | 48050-50233 | SWORD |
| 23 | 50234-52417 | J |
| 24 | 52418-54601 | WILD |
| 25 | 54602-56785 | WILD |
| 26 | 56786-58969 | HAMMER |
| 27 | 58970-61153 | SWORD |
| 28 | 61154-63337 | Q |
| 29 | 63338-65535 | WILD |

RANGE OF RANDOM NUMBERS
:0-65535

FIG. 9

BONUS GAME SYMBOL TABLE

| | | FIRST COLUMN(L1) | SECOND COLUMN(L2) | THIRD COLUMN(L3) | FOURTH COLUMN(L4) | FIFTH COLUMN(L5) |
|---|---|---|---|---|---|---|
| CODE NO. | RANDOM NUMBER | SYMBOL | SYMBOL | SYMBOL | SYMBOL | SYMBOL |
| 0 | 0-3277 | J | WILD | A | Q | WILD |
| 1 | 3278-6555 | WILD | A | J | J | WILD |
| 2 | 6556-9833 | BAT | WILD | BAT | BAT | WILD |
| 3 | 9834-13111 | J | HAMMER | SWORD | Q | WILD |
| 4 | 13112-16389 | WILD | WILD | WILD | K | WILD |
| 5 | 16390-19667 | RHINOCEROS | WILD | BAT | BAT | WILD |
| 6 | 19668-22945 | A | BUFFALO | WILD | A | RHINOCEROS |
| 7 | 22946-26223 | WILD | WILD | A | K | WILD |
| 8 | 26224-29501 | SWORD | K | J | HAMMER | WILD |
| 9 | 29502-32779 | WILD | WILD | WILD | Q | WILD |
| 10 | 32780-36057 | A | WILD | A | DEER | WILD |
| 11 | 36058-39335 | WILD | A | Q | SWORD | WILD |
| 12 | 39336-42613 | SWORD | WILD | WILD | FEATURE | WILD |
| 13 | 42614-45891 | WILD | DEER | K | K | WILD |
| 14 | 45892-49169 | WILD | WILD | BUFFALO | SWORD | WILD |
| 15 | 49170-52447 | A | SWORD | Q | DEER | WILD |
| 16 | 52448-55725 | WILD | WILD | FEATURE | A | WILD |
| 17 | 55726-59003 | J | BAT | A | HAMMER | WILD |
| 18 | 59004-62281 | Q | WILD | HAMMER | BUFFALO | WILD |
| 19 | 62282-65535 | BUFFALO | FEATURE | SWORD | RHINOCEROS | WILD |

RANGE OF RANDOM NUMBERS:0-65535

FIG. 10

SYMBOL COLUMN DETERMINATION TABLE

| SYMBOL COLUMN NO. | RANDOM NUMBER |
|---|---|
| 1 | 0-13106 |
| 2 | 13107-26214 |
| 3 | 26215-39321 |
| 4 | 39322-52428 |
| 5 | 52429-65535 |

RANGE OF RANDOM NUMBERS: 0-65535

FIG. 11

CODE NO.
DETERMINATION TABLE

| | |
|---|---|
| RANDOM NUMBER | CODE NO. |
| 0-3277 | 0 |
| 3278-6555 | 1 |
| 6556-9833 | 2 |
| 9834-13111 | 3 |
| 13112-16389 | 4 |
| 16390-19667 | 5 |
| 19668-22945 | 6 |
| 22946-26223 | 7 |
| 26224-29501 | 8 |
| 29502-32779 | 9 |
| 32780-36057 | 10 |
| 36058-39335 | 11 |
| 39336-42613 | 12 |
| 42614-45891 | 13 |
| 45892-49169 | 14 |
| 49170-52447 | 15 |
| 52448-55725 | 16 |
| 55726-59003 | 17 |
| 59004-62281 | 18 |
| 62282-64281 | 19 |
| 64282-65535 | END |

RANGE OF RANDOM NUMBERS:0-65535

FIG. 12

ADDITIONAL WILD SYMBOL COUNT DETERMINATION TABLE

| ADDITIONAL WILD SYMBOL COUNT | RANDOM NUMBER |
|---|---|
| 10 | 0-13106 |
| 30 | 13107-26214 |
| 50 | 26215-39321 |
| 70 | 39322-52428 |
| 90 | 52429-65535 |

RANGE OF RANDOM NUMBERS:0-65535

FIG. 13

ADDITIONAL TRIGGER SYMBOL COUNT DETERMINATION TABLE

| ADDITIONAL TRIGGER SYMBOL COUNT | RANDOM NUMBER |
|---|---|
| 2 | 0-13106 |
| 4 | 13107-26214 |
| 6 | 26215-39321 |
| 8 | 39322-52428 |
| 10 | 52429-65535 |

RANGE OF RANDOM NUMBERS: 0-65535

FIG. 14

PAYOUT TABLE

| SYMBOL | NUMBER OF SYMBOLS REARRANGED | | | |
|---|---|---|---|---|
| | TWO | THREE | FOUR | FIVE |
| A | 2 | 4 | 6 | 8 |
| K | 10 | 20 | 30 | 40 |
| Q | 30 | 60 | 90 | 120 |
| J | 3 | 6 | 9 | 12 |
| SWORD | 2 | 4 | 6 | 8 |
| HAMMER | 2 | 4 | 6 | 8 |
| BAT | 5 | 10 | 15 | 20 |
| DEER | 15 | 30 | 45 | 60 |
| RHINOCEROS | 8 | 16 | 24 | 32 |
| BUFFALO | 25 | 50 | 75 | 100 |
| FEATURE | 2 | 4 | 6 | 8 |

FEATURE: (FREE GAME) FREE GAME IS RUN WHEN THREE OR MORE "FEATURE" SYMBOLS ARE REARRANGED

FIG. 15

RESCUE SETTING TABLE

| AVERAGE BET AMOUNT | ADDITIONAL MULTIPLYING FACTOR (PAYOUT MULTIPLYING FACTOR × ADDITIONAL MULTIPLYING FACTOR) | ADDITIONAL GAME REPETITION COUNT (FIXED GAME REPETITION COUNT + ADDITIONAL GAME REPETITION COUNT) |
|---|---|---|
| 1−100 | 1. 2 | 10 |
| 101−200 | 1. 4 | 20 |
| 201−300 | 1. 6 | 30 |
| 301−400 | 1. 8 | 40 |
| 401−500 | 2. 0 | 50 |

FIG. 28

INSURANCE BET MANAGEMENT TABLE

| MACHINE NUMBER | INSURANCE FLAG | TOTAL BET COUNT | TOTAL BET AMOUNT |
|---|---|---|---|
| 1 | ON | 350 | 103000 |
| 2 | ON | 130 | 52000 |
| 3 | OFF | 0 | 0 |
| 4 | ON | 40 | 2000 |
| ... | ... | ... | ... |

GAMING MACHINE WHICH IS EXECUTABLE RESCUE PROCESS IN RESPONSE TO INSURANCE BET AND GAMING METHOD THEREOF

CROSS REFERENCE TO RELATED APPLICATION

The present application claims priority from Japanese Patent Application No. 2009-131948, which was filed on Jun. 1, 2009, the disclosure of which is herein incorporated by reference in its entirety.

BACKGROUND OF THE INVENTION

1. Field of the Invention

The present invention relates to a gaming machine which is executable a rescue process in which a payout, bonus, or the like is awarded in response to a predetermined game repeat count or lost game repeat count, and a gaming method of the gaming machine.

2. Description of Related Art

A conventional slot machine is arranged so that, when a player inserts a game value such as a coin and bill into an insertion slot of the slot machine and pushes a spin button, plural symbols are scroll-displayed in a display mounted on a front of a cabinet and each of the symbols is then stopped automatically.

In such slot machine, as disclosed in U.S. Pat. No. 6,604, 999 B2, U.S. Laid-Open Patent Publication No. 2002065124A1, or U.S. Laid-Open Patent Publication No. 20040053676A1 for example, when the symbols stopped on a winning line constitute a predetermined combination, a predetermined number of game values is paid out. This slot machine is arranged so that a player first of all determines the number of game values to be inserted and runs a game after inserting the game values into the insertion slot of the slot machine, and receives the payout of game values when a predetermined combination (winning combination) is achieved or loses the inserted game values when the player lose the game.

Whichever the reels are stopped in response to the operation of the stop button or each reel is automatically stopped at a random timing, the ratio (payout rate) of accumulated game values obtained by previous winnings to the number of game values inserted into the insertion slot of the slot machine prior to the start of each game becomes more or less constant as many games are repeatedly played in the slot machine. For the reason above, the frequency of winning with which a lot of game values are paid out only by achieving a single winning and with which a benefit game (bonus game) in which a winning is achievable quite easily is generally arranged to occur for example once in 100 games, in consideration of the payout rate.

Because the frequency of winning is determined in consideration of probability as above, in some cases the great winning occurs twice in 100 games and in other cases the great winning does not occur in 200 or 300 games. When no winning is achieved after playing a lot of games, the player keeps losing the game values and hence he/she may lose interest in continuing the games.

To solve this problem of the loss of interest in the games, slot machines which are arranged so that the player does not lose interest in games even if the number of game values decreases have been developed. Such slot machines are described, for example, in U.S. Pat. No. 5,178,390, U.S. Pat. No. 5,820,459, U.S. Pat. No. 6,695,697, U.S. Pat. No. 6,254, 483, U.S. Pat. No. 5,611,730, U.S. Pat. No. 5,639,088, U.S. Pat. No. 6,257,981, U.S. Pat. No. 6,234,896, U.S. Pat. No. 6,001,016, U.S. Pat. No. 6,273,820, U.S. Pat. No. 6,224,482, U.S. Pat. No. 4,669,731, U.S. Pat. No. 6,244,957, U.S. Pat. No. 5,910,048, U.S. Pat. No. 5,695,402, U.S. Pat. No. 6,003, 013, U.S. Pat. No. 4,283,709, U.S. Pat. No. 4,964,638, U.S. Pat. No. 6,089,980, U.S. Pat. No. 5,280,909, U.S. Pat. No. 5,702,303, U.S. Pat. No. 6,270,409, U.S. Pat. No. 5,770,533, U.S. Pat. No. 5,836,817, U.S. Pat. No. 6,932,704, U.S. Pat. No. 6,932,707, U.S. Pat. No. 4,837,728, U.S. Pat. No. 4,624, 459, U.S. Pat. No. 5,564,700, U.S. Pat. No. 5,890,963, U.S. Laid-Open Patent Publication No. 2003/0069073, European Laid-Open Patent Publication No. 1192975, European Laid-Open Patent Publication No. 1302914, European Laid-Open Patent Publication No. 1544811, European Laid-Open Patent Publication No. 1477947, European Laid-Open Patent Publication No. 1351180, European Laid-Open Patent Publication No. 0631798, German Laid-Open Patent Publication No. 4137010, German Laid-Open Patent Publication No. 3712841, German Laid-Open Patent Publication No. 3242890, German Laid-Open Patent Publication No. 10049444, British Laid-Open Patent Publication No. 2326830, WO Publication No. 2004/095383, WO Publication No. 03/083795, WO Publication No. 2007/026396, WO Publication No. 2007/026401, WO Publication No. 2007/026400, WO Publication No. 2007/026406, WO Publication No. 2007/026399, WO Publication No. 2007/026407, WO Publication No. 2007/026402, WO Publication No. 2007/026403 and WO Publication No. 2007/026404. The slot machines disclosed in these documents have a rescue process function with which a payout or bonus is awarded in response to a predetermined game repeat count or lost game repeat count.

As described above, it has been desirable for slot machines to have various rescue process functions to keep the players not to lose expectation on payout and bonus.

An objective of the present invention is to provide a gaming machine which is able to keep a player not to lose expectation by means of a rescue process function and a playing method thereof.

SUMMARY OF THE INVENTION

The present invention provides a gaming machine having the following structure.

Namely, the gaming machine includes a symbol display device which rearranges plural symbols, and a controller programmed to execute the following steps of:

(a1) on condition that a game value is bet, running a base game in which the symbols are rearranged on the symbol display device and a base payout is awarded according to the rearranged symbols;

(a2) on condition that the symbols are rearranged in a predetermined condition in the base game, running a bonus game in which the symbols are rearranged with a condition (e.g. the number of free games or wild symbols is increased) in which a payout rate is higher than that of the base game and a bonus payout is awarded according to the rearranged symbols;

(a3) making an insurance bet by using at least a part of the bonus payout awarded in the bonus game;

(a4) if the insurance bet has been made, determining whether a rescue start condition (e.g. when the base game is excessively repeated or when the total amount of obtained payout is excessively small) is established; and (a5) if the rescue start condition has been established, performing a rescue process (e.g. the number of free games or wild symbols is increased or an insurance payout is awarded).

According to the arrangement above, a bonus game is run when the symbols are rearranged in a predetermined condition in the base game. When a bonus payout is awarded as a result of the bonus game, an insurance bet is made by using at least a part of the bonus payout, with the result that a rescue process automatically becomes executable without letting the player notice the operation of the insurance bet. Thereafter, the running of the base game and bonus game is continued, and the rescue process is executed when the rescue start condition is established. In this way, even if the base game or the like is repeated while the rescue start condition is not established, it is possible to let the player continue the game with the expectation of the rescue process.

The present invention may be arranged so that, in the step (a2), a free game which does not require the betting of the game value is run as the bonus game.

According to the arrangement above, a bonus game is run by a free game and hence it is unnecessary to bet a game value during the bonus game. Therefore the present invention allows the player to easily recognize that the bonus game is being run and to easily recognize that the payout rate in the bonus game is higher than that of the base game.

The present invention may be arranged so that, in the step (a3), the least bonus payout among bonus payouts awarded according to the symbols in the bonus game is used.

According to this arrangement, it is possible to prevent a problem such that, when an insurance bet is made by using a bonus payout, i.e. when an insurance bet is collected from a bonus payout, the insurance bet cannot be made because of the shortage of the bonus payout.

The present invention may be arranged so that, in the step (a2), the bonus payout according to the symbols is awarded at once after the bonus game ends.

According to this arrangement, an awarded bonus payout is often large when the bonus payout is awarded at once after the end of the bonus game. In this case, the player does not easily notice the reduction from a bonus payout because a bonus payout is still large even after an insurance bet is collected therefrom. By the present invention, therefore, the player does not easily notice that an insurance bet is made by using a bonus payout.

The present invention may be arranged so that, in the step (a4), whether the rescue start condition has been established is determined according to whether the number of repetition of the base game has reached a predetermined number.

According to this arrangement, the number of repetition of the base game is used as the rescue start condition and hence it is possible to remove a major reason of the player's loss of interest in the game after the repetition of the base game.

The present invention may be arranged so that, in the step (a5), a free game which does not require the betting of the game value is run as the rescue process.

According to this arrangement, the running of a free game in the rescue process causes the player to easily recognize that the rescue process is executed.

The present invention may be arranged so that, in the step (a5), the free game is run with a game repeat count corresponding to an average bet amount until the rescue process is performed.

According to this arrangement, a game repeat count of a free game is changeable in accordance with an average bet amount. It is therefore possible to adjust the number of repetition of a free game in the rescue process so that a large gain is awarded to a player having a low average bet amount, i.e. a player who has lost a large amount of game values.

The present invention may be arranged so that, in the step (a5), the free game is run with a payout amount corresponding to an average bet amount until the rescue process is performed.

According to the arrangement above, an amount of payouts in a free game is changeable in accordance with an average bet amount. It is therefore possible to adjust an amount of payouts in a free game in the rescue process so that a large gain is awarded to a player having a low average bet amount, i.e. a player who has lost a large amount of game values.

The present invention provides a gaming machine having the following structure.

Namely, the gaming machine includes a symbol display device which rearranges plural symbols, and a controller programmed to execute the following steps of:

(b1) on condition that a game value is bet, running a base game in which the symbols are rearranged on the symbol display device and a base payout is awarded according to the rearranged symbols;

(b2) when the symbols are rearranged in a predetermined condition in the base game, running a bonus game in which a free game which does not require the betting of the game value is repeated plural times in accordance with a game repeat count, the symbols are rearranged in the free game, and a bonus payout corresponding to the rearranged symbols is awarded at once after the bonus game ends;

(b3) making an insurance bet by using the lowest bonus payout among bonus payouts which are awarded in accordance with the symbols in the bonus game;

(b4) if the insurance bet has been made, determining whether a rescue start condition (e.g. when the base game is excessively repeated or when the total amount of obtained payout is excessively small) has been established according to whether the number of repetition of the base game has reached a predetermined number; and (b5) if the rescue start condition has been established, performing a rescue process (e.g. the number of free games or wild symbols is increased) with at least one of game modes of a game repeat count and a payout amount corresponding to an average bet amount until the rescue process is performed.

According to the arrangement above, a bonus game is run when the symbols are rearranged in a predetermined condition in the base game. When a bonus payout is awarded as a result of the bonus game, an insurance bet is made by using at least a part of the bonus payout, with the result that a rescue process automatically becomes executable without letting the player notice the operation of the insurance bet. Thereafter, the running of the base game and bonus game is continued, and the rescue process is executed when the rescue start condition is established. In this way, even if the base game or the like is repeated while the rescue start condition is not established, it is possible to let the player continue the game with the expectation of the rescue process.

According to the arrangement above, furthermore, a bonus game is run by a free game and hence it is unnecessary to bet a game value during the bonus game. Therefore the present invention allows the player to easily recognize that the bonus game is being run and to easily recognize that the payout rate in the bonus game is higher than that of the base game.

According to the arrangement above, furthermore, it is possible to prevent a problem such that, when an insurance bet is made by using a bonus payout, i.e. when an insurance bet is collected from a bonus payout, the insurance bet cannot be made because of the shortage of the bonus payout. According to the arrangement above, furthermore, an awarded bonus payout is often large when the bonus payout is awarded at once after the end of the bonus game. In this case, the player does not easily notice the reduction from a bonus payout because a bonus payout is still large even after an insurance bet is collected therefrom. By the present invention, therefore, the player does not easily notice that an insurance bet is made by using a bonus payout.

According to the arrangement above, furthermore, the number of repetition of the base game is used as the rescue start condition and hence it is possible to remove a major reason of the player's loss of interest in the game after the repetition of the base game. According to the arrangement above, furthermore, the running of a free game in the rescue process causes the player to easily recognize that the rescue process is executed.

According to the arrangement above, furthermore, a game repeat count of a free game is changeable in accordance with an average bet amount. It is therefore possible to adjust the number of repetition of a free game in the rescue process so that a large gain is awarded to a player having a low average bet amount, i.e. a player who has lost a large amount of game values. According to the arrangement above, furthermore, an amount of payouts in a free game is changeable in accordance with an average bet amount. It is therefore possible to adjust an amount of payouts in a free game in the rescue process so that a large gain is awarded to a player having a low average bet amount, i.e. a player who has lost a large amount of game values.

The present invention provides a gaming method of a gaming machine, including the steps of:

on condition that a game value is bet, running a base game in which symbols are rearranged on the symbol display device and a base payout is awarded according to the rearranged symbols;

on condition that the symbols are rearranged in a predetermined condition in the base game, running a bonus game in which the symbols are rearranged with a condition (e.g. the number of free games or wild symbols is increased) in which a payout rate is higher than that of the base game and a bonus payout is awarded according to the rearranged symbols;

making an insurance bet by using at least a part of the bonus payout awarded in the bonus game;

if the insurance bet has been made, determining whether a rescue start condition (e.g. when the base game is excessively repeated or when the total amount of obtained payout is excessively small) is established; and if the rescue start condition has been established, performing a rescue process (e.g. the number of free games or wild symbols is increased or an insurance payout is awarded).

According to the arrangement above, a bonus game is run when the symbols are rearranged in a predetermined condition in the base game. When a bonus payout is awarded as a result of the bonus game, an insurance bet is made by using at least a part of the bonus payout, with the result that a rescue process automatically becomes executable without letting the player notice the operation of the insurance bet. Thereafter, the running of the base game and bonus game is continued, and the rescue process is executed when the rescue start condition is established. In this way, even if the base game or the like is repeated while the rescue start condition is not established, it is possible to let the player continue the game with the expectation of the rescue process.

The present invention is able to keep a player not to lose expectation by means of a rescue process function.

BRIEF DESCRIPTION OF THE DRAWINGS

FIG. 6 is an explanatory diagram of a base game symbol data table.

FIG. 7 is an explanatory diagram of a bonus game symbol table.

FIG. 8 is an explanatory diagram of a bonus game symbol table.

FIG. 9 is an explanatory diagram of a bonus game symbol table.

FIG. 10 is an explanatory diagram of a symbol column determination table.

FIG. 11 is an explanatory diagram of a code No. determination table.

FIG. 12 is an explanatory diagram of an additional wild symbol count determination table.

FIG. 13 is an explanatory diagram of an additional trigger symbol count determination table.

FIG. 14 is an explanatory diagram of a payout table.

FIG. 15 is an explanatory diagram of a rescue setting table.

FIG. 28 is an explanatory diagram of an insurance bet management table.

DESCRIPTION OF THE PREFERRED EMBODIMENTS

Embodiment 1

Gaming Machine Overview

Figure 1:
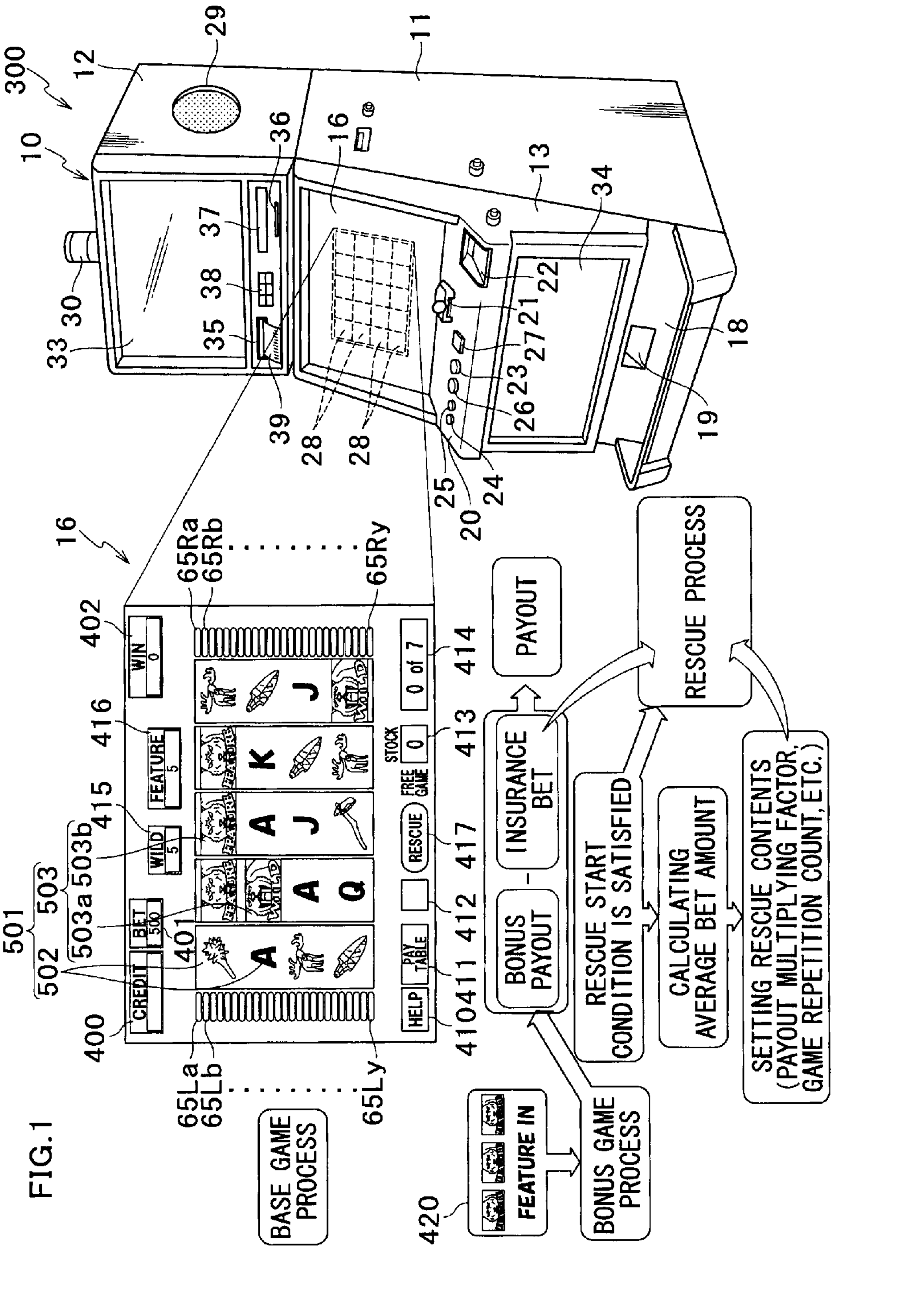
FIG. 1 is an explanatory diagram illustrating a playing method of a gaming machine.

As shown in FIG. 1, a gaming machine 300 has a slot machine 10 which collects an insurance bet from a bonus payout. This slot machine 10 in the present embodiment may be an independent slot machine 10 intended for a single player, or a slot machine 10 connected to and in communication with another slot machine 10 so that the and the other slot machines 10 as a whole enable participation of plural players as described later.

Specifically, the slot machine 10 as a gaming machine 300 includes, in a first arrangement, a symbol display device 16 which rearranges symbols 501 and a controller programmed to execute the following processes of (a1) to (a5).

In (a1), a base game, which awards a base payout according to symbols 501 rearranged on the symbol display device 16, is run on condition that a game value is bet. In (a2), on condition that the symbols 501 are rearranged in a predetermined condition in the base game, a bonus game is run which awards a bonus payout according to the rearranged symbols 501 so that the payout rate is higher than that of the base game. In (a3), an insurance bet is made by using at least a part of the bonus payout awarded in the bonus game. In (a4), whether a rescue start condition is established is determined when the insurance bet is made. In (a5), a rescue process is carried out when the rescue start condition is established.

The symbols 501 include "specific symbols" 503 in addition to ordinary symbols 502. That is, the "symbols 501" is a superordinate conception of the specific symbols 503 and ordinary symbols 502. The specific symbols 503 include a wild symbol **503*a* and a trigger symbol 503*b*. The wild symbol 503*a* is a symbol substitutable for any type of symbol 501. Trigger symbol 503*b* is a symbol serving as a trigger for starting at least a bonus game. That is, the trigger symbol 503*b* triggers transition from the base game to the bonus game, and triggers stepwise increases in the number of specific symbols 503 at intervals from the start of the bonus game. Further, the trigger symbol 503*b* triggers increases in the number of specific symbols 503 in the bonus game, that is, the trigger symbol 503*b* triggers increases in the number of trigger symbols 503*b* and/or wild symbols 503*a*. Note that the trigger symbol 503*b*** may trigger increases in the game repeat count of the bonus game in the bonus game.

The game value is a coin, bill, or valuable information corresponding to these. Note that the game value in the present invention is not particularly limited. Examples of the game value includes medals, tokens, cyber money, tickets. The ticket is not particularly limited, and a later-mentioned ticket with a barcode may be adopted for example.

The "bonus game" is identical with "feature game". In the present embodiment, the bonus game is a game in which a free game is repeated. However, the bonus game is not particularly limited and may be any type of game, provided that the bonus game is more advantageous than the base game for a player. Another bonus game may be adopted in combination, provided that the player is given a more advantageous playing conditions than the base game. For example, the bonus game may be a game that provides a player with a chance of winning more game values than the base game or a game that provides a player with a higher chance of winning game values than the base game. Alternatively, the bonus game may be a game that consumes less number of game values than the base game. Further, the bonus game may be a game that provides a combination of these and other advantageous conditions to a player.

A game runnable with a bet of less game values than the base game is referred to as "free game". Note that "bet of less game values" encompasses betting of zero game value. The "free game" therefore may be a game runnable without a bet of game value, which awards an amount of game values according to symbols 501 having been rearranged. In other words, "free game" is a game which is started without the premise of consuming a game value. To the contrary, a later-mentioned "base game" is a game runnable on condition that a game value is bet, which awards an amount of game values according to symbols 501 rearranged. In other words, "base game" is a game which starts on the premise that a game value is consumed.

The expression "rearrange" means dismissing an arrangement of symbols 501, and once again arranging symbols 501. An "arrangement" in this specification means a state of symbols 501, which can be visibly confirmed by a player.

The expression "base payout according to rearranged symbols 501" means a base payout corresponding to a rearranged winning combination. The expression "bonus payout according to rearranged symbols 501" means a bonus payout corresponding to a rearranged winning combination. The expression "winning combination" means that a winning is achieved. The winning combination is detailed later.

The "condition in which the payout rate is higher than that of the base game" is, for example, the running of a free game, increases in the number of wild symbols **503*a* and trigger symbols 503*b*, or the running of a game using a symbol table in which a symbol has been replaced with another symbol. The "rescue start condition" is, for example, a condition in which a base game is excessively repeated, i.e. a base game is repeated more than a predetermined number of times, or a condition in which the total number of obtained payout is excessively small, i.e. the number of base payout and bonus payout obtained after a single player repeats the game more than a predetermined number of times is not higher than a predetermined number. The "rescue process" is a process to rescue a player. Examples of the rescue process include the running or a free game, increases in the number of wild symbols 503*a* and trigger symbols 503*b***, the running of a game using a symbol table in which a symbol has been replaced with another symbol, and the awarding of an insurance payout.

The slot machine 10 (gaming machine 300) having the above-described arrangements realizes a gaming method of collecting an insurance bet from a bonus payout. In other words, the slot machine 10 (gaming machine 300) is arranged to be operable at least by a control method of collecting an insurance bet from a bonus payout.

More specifically, the gaming method (control method) of the slot machine 10 includes the steps of: running a base game in which symbols 501 are rearranged on condition that a game value is bet and a base payout is awarded according to the rearranged symbols 501; running a bonus game in which, when the symbols 501 are rearranged with a predetermined condition in the base game, symbols 501 are rearranged with a condition of a higher payout rate than that of the base game and a bonus payout is awarded according to the rearranged symbols 501; making an insurance bet by using at least a part of the bonus payout awarded in the bonus game; when the insurance bet is made, determining whether a rescue start condition is established; and when the rescue start condition is established, executing a rescue process.

With the gaming machine 300 having the first arrangement or the playing method (control method) including the above mentioned steps, a bonus game is run when symbols 501 are rearranged in a predetermined condition in a base game. When a bonus payout is awarded as a result of the bonus game, an insurance bet is made by using at least a part of the bonus payout, with the result that a rescue process automatically becomes executable without letting the player notice the operation of the insurance bet. Thereafter, the running of the base game and bonus game is continued, and the rescue process is executed when the rescue start condition is established. In this way, even if the base game or the like is repeated while the rescue start condition is not established, it is possible to let the player continue the game with the expectation of the rescue process.

The slot machine 10 may have, in addition to the first arrangement, a second arrangement in which a free game which does not require the betting of a game value is run as a bonus game in (a2). In the slot machine 10 having the second arrangement, a bonus game is run by a free game and hence it is unnecessary to bet a game value during the bonus game. Therefore the slot machine 10 allows the player to easily recognize that the bonus game is being run and to easily recognize that the payout rate in the bonus game is higher than that of the base game.

The slot machine 10 may include, in addition to the first and second arrangements, a third arrangement in which the lowest bonus payout among the bonus payouts awarded in accordance with the symbols 501 in the bonus game is used in (a3). In the slot machine 10 having the third arrangement, it is possible to prevent a problem such that, when an insurance bet is made by using a bonus bet, i.e. when an insurance bet is collected from a bonus bet, the insurance bet cannot be made because of the shortage of the bonus payout.

The slot machine 10 may have, in addition to one of the first to third arrangements, a fourth arrangement in which in (a2) a bonus payout corresponding to symbols 501 is awarded at once after the end of the bonus game. In the slot machine 10 having the fourth arrangement, an awarded bonus payout is often large when the bonus payout is awarded at once after the end of the bonus game. In this case, the player does not easily notice the reduction from a bonus payout because a bonus payout is still large even after an insurance bet is collected therefrom. By the present invention, therefore, the player does not easily notice that an insurance bet is made by using a bonus payout.

The slot machine 10 may have, in addition to one of the first to fourth arrangements, a fifth arrangement in which in (a4) whether the rescue start condition is established is determined based on whether the number of repetition of the base game reaches a predetermined number. In the slot machine 10 of the fifth arrangement, the number of repetition of the base game is used as the rescue start condition and hence it is possible to remove a major reason of the player's loss of interest in the game after the repetition of the base game.

The slot machine 10 may have, in addition to one of the first to fifth arrangements, a sixth arrangement in which in (a5) a free game which does not require the betting of a game value is run as a rescue process. According to this arrangement, the running of a free game in the rescue process causes the player to easily recognize that the rescue process is executed.

The slot machine 10 may have, in addition to one of the first to sixth arrangements, a seventh arrangement in which in (a5) a free game is run with a game repeat count corresponding to an average bet amount until the execution of the rescue process. In the slot machine 10 having the seventh arrangement, a game repeat count of a free game is changeable in accordance with an average bet amount. It is therefore possible to adjust the number of repetition of a free game in the rescue process so that a large gain is awarded to a player having a low average bet amount, i.e. a player who has lost a large amount of game values.

The slot machine 10 may have, in addition to one of the first to seventh arrangements, an eighth arrangement in which in (a5) a free game is run with a payout amount corresponding to an average bet amount until the rescue process is executed. The payout amount in this case may be an amount of game values or a payout multiplying factor by which the bet amount is multiplied. According to the arrangement above, an amount of payouts in a free game is changeable in accordance with an average bet amount. It is therefore possible to adjust an amount of payouts in a free game in the rescue process so that a large gain is awarded to a player having a low average bet amount, i.e. a player who has lost a large amount of game values.

The slot machine 10 may have, in addition to the first, second, third, fourth, fifth, and sixth arrangements, at least one of the sixth and seventh arrangements.

Namely, a slot machine 10 may have a symbol display device 16 which rearranges plural symbols 501, and a controller programmed to execute the following steps of (b1) to (b5).

In (b1), a base game is carried out in which symbols 501 are rearranged on the symbol display device 16 in response to the betting of a game value and a base payout is awarded according to the rearranged symbols 501. In (b2), a bonus game is carried out in which, when the symbol 501 are rearranged in a predetermined condition in the base game, a free game which does not require the betting of a game value is repeated with more than one game repeat counts, the symbols 501 are rearranged in a free game, and a bonus payout according to the rearranged symbols 501 is awarded at once after the end of the game.

In (b3), an insurance bet is made by using the lowest bonus payout among the bonus payouts which are awarded in accordance with the symbols 501 in the bonus game. (b4) is a step in which, if the insurance bet has been made, whether the rescue start condition is established is determined based on whether the number of repetition of the base game reaches a predetermined number. (b5) is a step in which, if the rescue start condition has been established, a rescue process is executed with at least one of the game modes of game repeat count and payout amount corresponding to an average bet amount until the execution of the rescue process.

(Functional Blocks of Gaming Machine 300)

Figure 2:
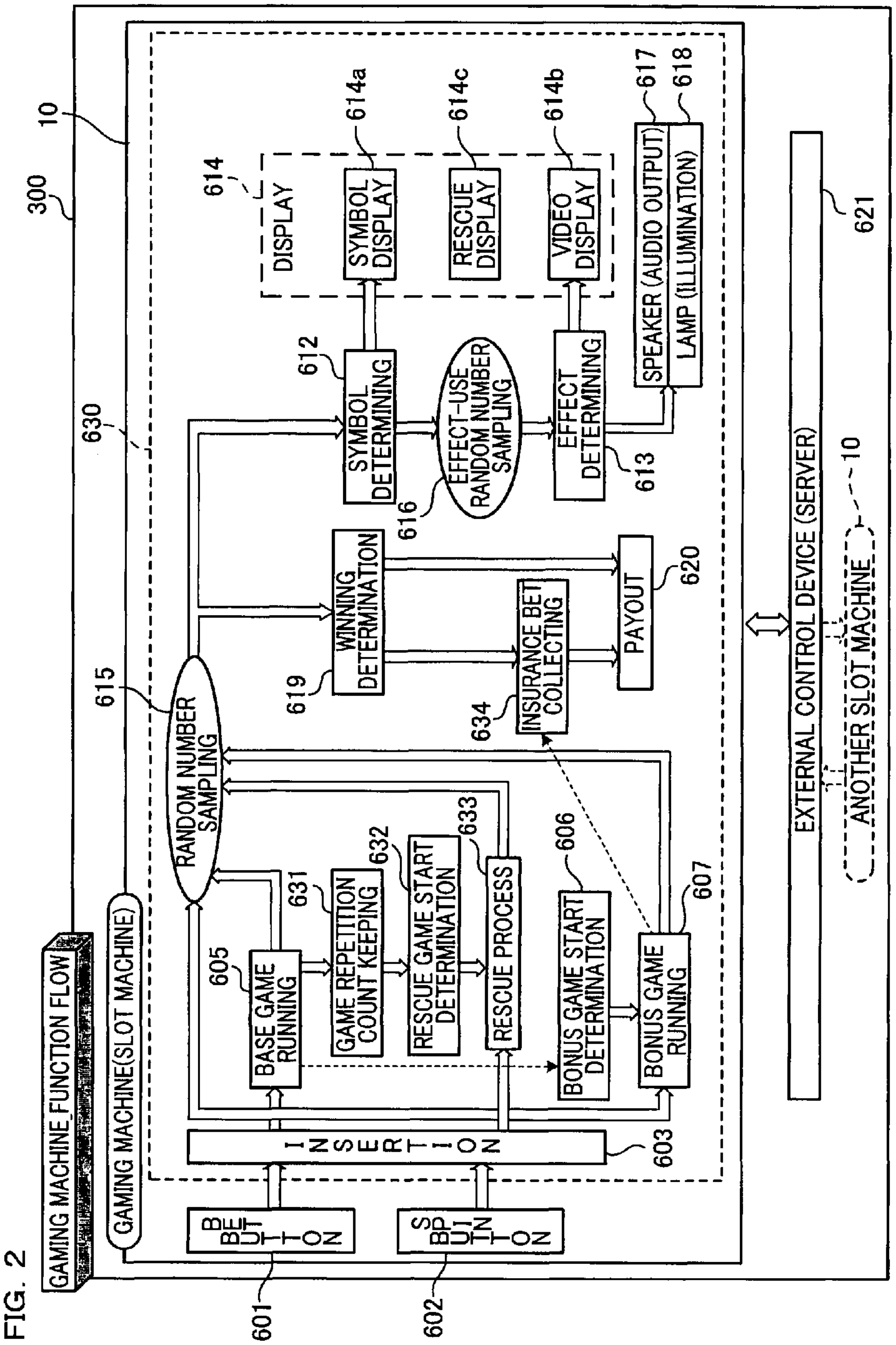
FIG. 2 is a block diagram of the gaming machine.

As illustrated in FIG. 2, the gaming machine 300 structured as described above includes: plural slot machines 10 and an external controller 621 (server) connected to and in communication with the slot machines 10. The external controller 621 is connected to and in communication with the slot machines 10 installed in the hall. This external controller 621 is provided for remotely operating and monitoring the operating conditions of each slot machine 10 and the processes such as changes in various game setting values. In cases where participation of plural players is possible, plural slot machines 10 and an external controller 621 constitute a gaming machine 300.

Each slot machine 10 includes a bet button unit 601, a spin button unit 602, a display unit 614, and a game controller 630 which controls these units.

The bet button unit 601 has a function of accepting a player's operation for entering a bet amount. The spin button unit 602 has a function of accepting a player's operation for starting a game. The display unit 614 has a function of displaying, in the form of a still image, various symbols 501, numerical values, marks, or the like, and displaying moving pictures such as an effect movie. The display unit 614 has a symbol display region 614*a*, a video display region 614*b*, and a rescue display region 614*c*. The symbol display region 614*a* displays symbols 501 illustrated in FIG. 1. The video display region 614*b* displays various effect video information to be displayed during a game, in the form of moving image or still image. The rescue display region 614*c* displays rescue information indicating whether the rescue process is in progress or not and rescue information indicating that the rescue process will start within a predetermined game repeat count. It is noted that the rescue information may be displayed as a color, text, or symbol.

The game controller 630 includes: a coin insertion/start-check unit 603; a base game running unit 605; a bonus game start determination unit 606; a bonus game running unit 607; a random number sampling unit 615; a symbol determining unit 612; an effect-use random number sampling unit 616; an effect determining unit 613; a speaker unit 617; a lamp unit 618; a winning determining unit 619; and a payout unit 620. The game controller 630 further includes a game repeat count unit 631, a rescue game start determination unit 632, a rescue process unit 633, and an insurance bet collecting unit 634.

The base game running unit 605 has a function of running a base game on condition that the bet button unit 601 is operated. The bonus game start determination unit 606 determines whether to run a bonus game, based on a combination of rearranged symbols 501 resulted from the base game. That is, the bonus game start determination unit 606 has functions of: (a) determining that the player is entitled to a bonus game, when a trigger symbol 503*b* is rearranged so as to satisfy a predetermined condition; and (b) activating the bonus game running unit 607 so as to run a bonus game from the subsequent unit game.

Note that a unit game includes a series of operations performed within a period between a start of receiving a bet to a point where a winning may be resulted. For example, a bet time in which a bet is received, a game time in which symbols 501 having been stopped are rearranged, and a payout time for a payout process to award a payout are performed once each within a single unit game of the base game.

The bonus game running unit 607 has a function of running the bonus game which is started simply by operating the spin button unit 602, and which repeats a free game plural times. The bonus game running unit 607 also has a function of outputting bonus game running information to a specific symbol increasing unit and a gaming result determining unit which are not illustrated. The specific symbol increasing unit has: a function of detecting a start of the bonus game based on the bonus game running information; a function of increasing stepwise the number of specific symbols 503 in the group of symbols 501, at an interval from the beginning of the bonus game; a function of outputting to the symbol determining unit information on an increase in the number of specific symbols 503, as symbol-increase information; and a function of outputting the symbol-increase information to the symbol count display unit. The symbol count display unit has a function of outputting the symbol-increase information to the symbol quantity display region of the display unit 614.

The symbol determining unit has: a function of determining symbols 501 to be rearranged, by using a random number given by the random number sampling unit 615; a function of rearranging the selected symbols 501 on the symbol display region 614*a* of the display unit 614; a function of outputting information of the symbols 501 rearranged, to the winning determining unit 619; a function of, based on symbol-increase information from the specific symbol increasing unit, increasing the number of specific symbols 503 in the group of symbols 501 from which symbols to be rearranged are selected; a function of replacing at least one of the symbols 501 in the group, with some or all of the specific symbols 503 having increased in number; and a function of outputting an effect designation signal to the effect-use random number sampling unit 616, based on the conditions of the rearrangement of the symbols 501.

The effect-use random number sampling unit 616 has functions of, when receiving the effect instruction signal from the symbol determining unit, sampling an effect-use random number and outputting the effect-use random number to the effect determining unit. The effect determining unit has: a function of determining an effect by using the effect-use random number; a function of outputting, to a video display region 614*b* of the display unit 614, video information in the effect thus determined; and a function of outputting audio information and illumination information of the effect to the speaker unit 617 and the lamp unit 618, respectively.

The winning determining unit 619 has a function of determining whether a winning is resulted when information of symbols 501 rearranged and displayed on the display unit 614 is given; a function of calculating a payout when it is determined that a winning has resulted, based on the winning combination; and a function of outputting to the payout unit 620 a payout signal which is based on the amount of payout.

Further, the gaming result determining unit which receives bonus game running information from the bonus game running unit 607 has: a function of determining whether a specific symbol 503 is rearranged in the bonus game, based on the information given from the symbol determining unit and the winning determining unit 619; and a function of outputting determination result information to the gaming result determining unit. The gaming result determining unit has a function of determining a gaming result in relation to the number of specific symbols 503 rearranged, and a function of awarding a gain to the player based on the determination result information. For example, to achieve the function of awarding a gain, the gaming result determining unit has a function of outputting to the specific symbol increasing unit an instruction signal for causing an increase in the number of specific symbols 503.

The game repeat count unit 631 has a function of counting the game number indicating how many times the base game is repeated and setting the counted number as the number of repetition. The rescue game start determination unit 632 has a function of determining whether the rescue start condition is established. More specifically, the rescue game start determination unit 632 determines whether the number of repetition of the base game has reached a predetermined number.

The rescue process unit 633 has a function of executing the rescue process when it is determined that the rescue start condition has been established. More specifically, the rescue process unit 633 has a function of, when the rescue start condition has been established, executing the rescue process with at least one of the game modes of game repeat count and payout amount corresponding to an average bet amount until the execution of the rescue process.

The insurance bet collecting unit 634 has a function of making an insurance bet by using the lowest bonus payout among the bonus payouts which are awarded in the bonus game in accordance with the symbols 501. The payout unit 620 has a function of awarding a bonus payout at once after the end of the game, in addition to the typical payout functions of awarding a base payout and a bonus payout.

(Operation of Gaming Machine 300)

Figure 3:
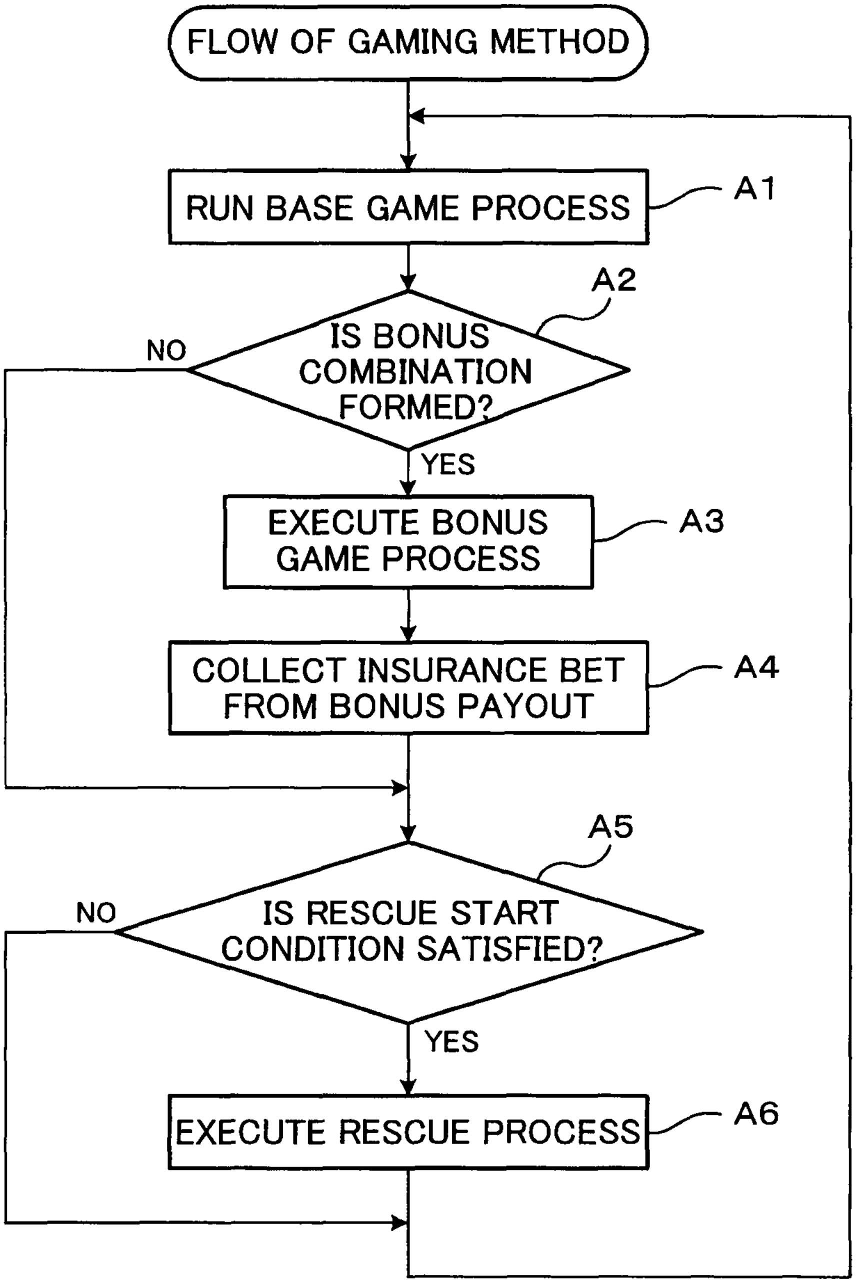
FIG. 3 is a flowchart illustrating the playing method of the gaming machine.

The following describes, with reference to the flowchart in FIG. 3, an operation of the gaming machine 300 having the above described functional blocks.

First, a base game is run (A1). Specifically, a series of the following operations are performed.

(Coin Insertion/Start-Checking)

First, the gaming machine 300 checks if the bet button unit 601 is pressed by a player, and if the spin button unit 602 is pressed by the player.

(Symbol Determination)

Next, when the player presses the spin button unit 602, the gaming machine 300 samples a random number for symbol determination. Then, for each video reel displayed on the display unit 614, the gaming machine 300 determines symbols 501 to be presented to the player when scrolling of symbol columns is stopped.

(Symbol Display)

Next, the gaming machine 300 starts scrolling the symbol column on the video reels, and stops the scrolling so as to present to the player the selected symbols 501.

(Winning Determination)

When the scrolling of the symbol columns on the video reels is stopped, the gaming machine 300 determines whether the combination of the symbols 501 presented to the player relates to a winning.

(Payout)

Next, when it is determined that the combination of the symbols 501 presented to the player relates to a winning, the gaming machine 300 awards a benefit to the player according to the combination of the symbols 501.

For example, when the combination of symbols 501 displayed relates to payout of coins, the gaming machine 300 pays out to the player a predetermined number of coins according to the combination of the symbols 501.

Next, whether a bonus combination is formed is determined (A2). When a bonus combination is formed (A2: YES), a bonus game process is executed (A3) and then an insurance bet is collected from the bonus payout (A4). On the other hand, when no bonus combination is formed (A2: NO) or an insurance bet is collected from the bonus payout (A4), whether the rescue start condition is established is determined (A5). More specifically, the game repeat count unit 631 counts the number of repetition of the base game. Then the rescue game start determination unit 632 determines whether the number of repetition of the base game reaches a predetermined number.

When the rescue start condition is not established (A6: NO), the step A1 is executed again. On the other hand, when the rescue start condition is established (A6: YES), after the execution of the rescue process (A6) the step A1 is executed again. More specifically, when the rescue start condition is established, the rescue process is executed with at least one of the game modes of game repeat count and payout amount corresponding to an average bet amount until the execution of the rescue process.

As a result of this, when a bonus payout is awarded on account of the running of a bonus game, an insurance bet is made by using at least a part of the bonus payout. Therefore the rescue process automatically becomes executable without letting the player notice the operation of the insurance bet. Thereafter, the running of the base game and bonus game is continued, and the rescue process is executed when the rescue start condition is established. In this way, even if the base game or the like is repeated while the rescue start condition is not established, it is possible to let the player continue the game with the expectation of the rescue process.

(Mechanical Structure of Slot Machine 10)

Figure 4:
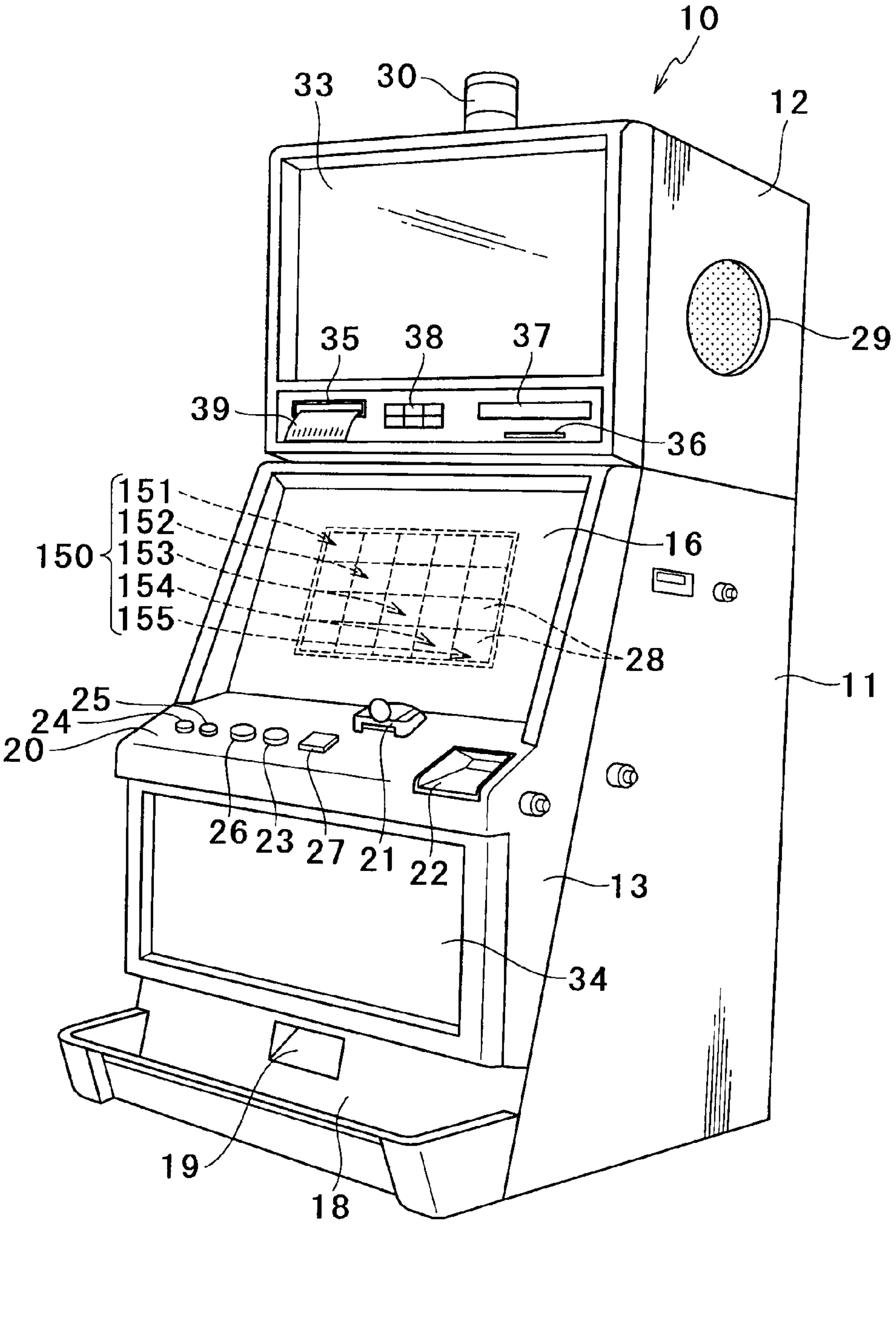
FIG. 4 is a perspective view of a slot machine in the gaming machine.

As illustrated in FIG. 4, the slot machine 10 runs a unit game when a game value is spent. The slot machine 10 includes: a cabinet 11, a top box 12 provided above the cabinet 11, and a main door 13 provided on the front surface of the cabinet 11.

The main door 13 has a symbol display device 16 which is also referred to as lower image display panel. The symbol display device 16 includes a transparent liquid crystal panel. The symbol display device 16 has a display window 150 at its central portion. The display window 150 includes 20 display blocks 28 which are arranged in five columns and four rows. The columns form pseudo reels 151 to 155, each having four display blocks 28. The four display block 28 in each of the pseudo reels 151 to 155 are displayed as if all the display blocks 28 are moving downward at various speed. This enables rearrangement in which symbols 501 respectively displayed in the display blocks 28 are rotated in a longitudinal direction and stopped thereafter.

Figure 16:
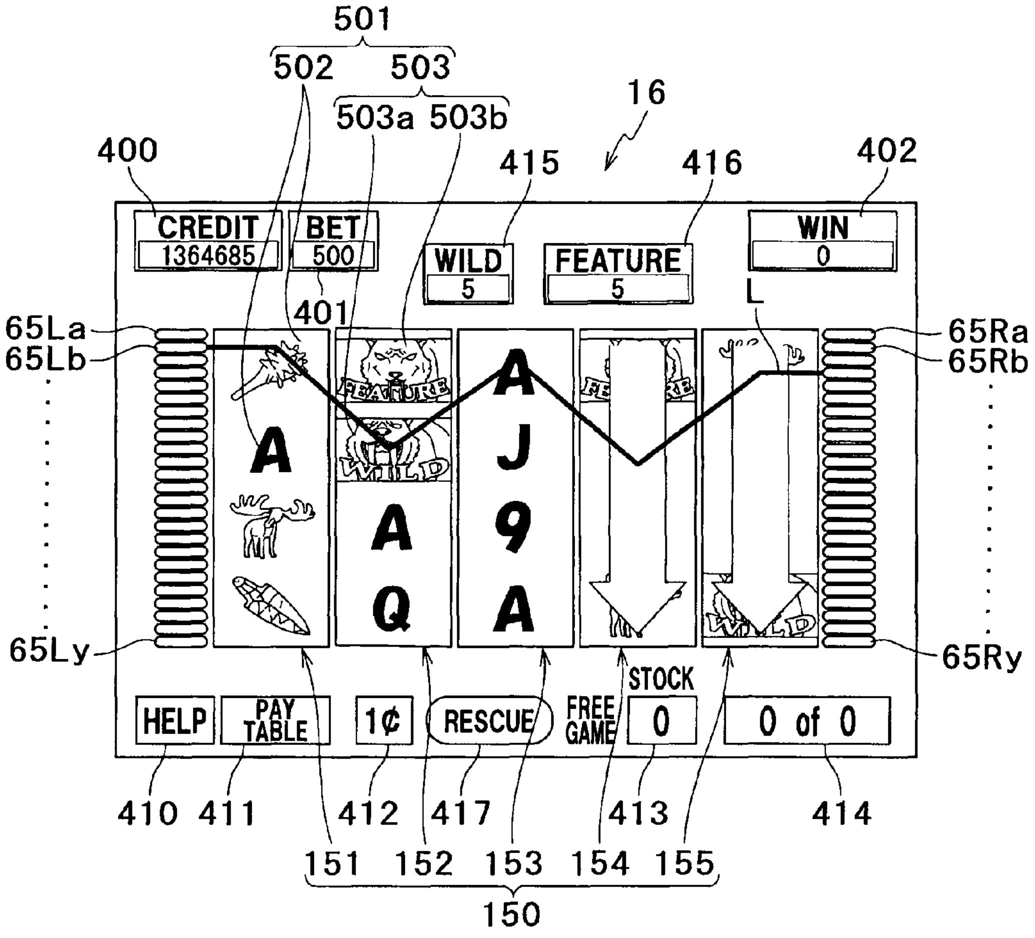
FIG. 16 is an explanatory diagram illustrating a display status of the symbol display device.

On both sides of the display window 150 are payline occurrence columns which are symmetrically arranged. As illustrated in FIG. 16, a payline occurrence column on the left when viewed from the player side includes 25 payline occurrence parts 65L (65La to 65Ly).

On the other hand, a payline occurrence column on the right when viewed from the player side includes 25 payline occurrence parts 65R (65Ra to 65Ry).

Each payline occurrence part 65L is paired with one of the payline occurrence parts 65R. For each pair of the payline occurrence parts 65L and 65R, there is a prescribed payline L which extends from the payline occurrence part 65L to the payline occurrence part 65R paired with that payline occurrence part 65L. Although there are 25 paylines, FIG. 16 only shows one payline L for the sake of easier understanding.

Each payline L is activated when the payline L connects a pair of payline occurrence parts 65L and 65R. The payline L otherwise is inactive. The number of active paylines L is determined base on the bet amount. When the bet amount is the maximum, the maximum number of paylines L (i.e. 25 paylines L) are activated. Each activated payline L forms various winning combinations of symbols 501. The winning combination is detailed later.

The present embodiment deals with a case where the slot machine 10 is a video slot machine. However, the slot machine 10 of the present invention may partially adopt a mechanical reel in place of the pseudo reels 151 to 155.

Further, a not-shown touch panel is disposed at the front surface of the symbol display device 16, and a player is able to input various instructions by operating the touch panel. From the touch panel, an input signal is transferred to the main CPU 41.

Below the lower image panel 16 are a control panel 20, a coin receiving slot 21, and a bill validator 22. The control panel 20 includes plural buttons 23 to 27 by which a player is able to input an instruction related to progression of a game. The coin receiving slot 21 receives a coin and takes it into the cabinet 11.

The control panel 20 has: a start button 23, a change button 24, a cashout button 25, a 1-bet button 26, and a maximum bet button 27. The start button 23 is for inputting an instruction to start scrolling symbols. A change button 24 is used when requesting a gaming facility staff member to exchange money. The cashout button 25 is for inputting an instruction to pay out credited coins to a coin tray 18.

The 1-bet button 26 is for inputting an instruction to bet a single coin out of the credited coins. The maximum bet button 27 is for inputting an instruction to bet the maximum number of coins bettable in one game (500 coins in this embodiment), out of the credited coins. The slot machine 10 of the present embodiment does not have an insurance bet button because it automatically switches between the uninsured mode and the insured mode. Alternatively, the slot machine 10 may have an insurance bet button if necessary. If the insurance bet button is included, manual switching between the uninsured mode and the insured mode is possible in addition to the automatic switching. When the uninsured mode is manually set by the insurance bet button, the insured mode may be automatically set after the bonus game ends.

The bill validator 22 is for validating the legitimacy of a bill input, and takes into the cabinet 11 those recognized as legitimate. The bill validator 22 may be also capable of reading a barcode on a later-mentioned barcoded ticket 39. On the lower front surface of the main door 13, that is, below the control panel 20, there is provided a belly glass 34 with a character or the like of the slot machine 10 being drawn thereon.

On the front surface of the top box 12 is an upper image display panel 33. The upper image display panel 33 has a liquid crystal panel, and displays thereon an image or text which provides introduction to the game, the rules of the game, or the like information.

Further, the top box 12 is provided with speakers 29. Below the upper image display panel 33 are a ticket printer 35, a card reader 36, a data displayer 37, and a keypad 38. The ticket printer 35 prints on a ticket a barcode and outputs the ticket as a barcoded ticket 39. A barcode is encoded data containing a credit amount, date, an identification number of the slot machine 10, or the like. A player is able to exchange the barcoded ticket 39 with bill or the like at a predetermined location in the gaming facility (e.g. change booth of a casino).

The card reader 36 reads/writes data from/into a smart card. The smart card is carried by a player, and stores therein data for identifying the player, data relating to a history of games played by the player, or the like. The smart card may store data of coins, bill, or a credit card. Further, it is possible to adopt a magnet stripe card instead of the smart card. The data displayer 37 includes a fluorescent display or the like, and displays the data read by the card reader 36 and the data input by the player through the keypad 38. The keypad 38 is for entering instructions or data relating to issuing of a ticket or the like.

(Electric Structure of Slot Machine 10)

Figure 5:
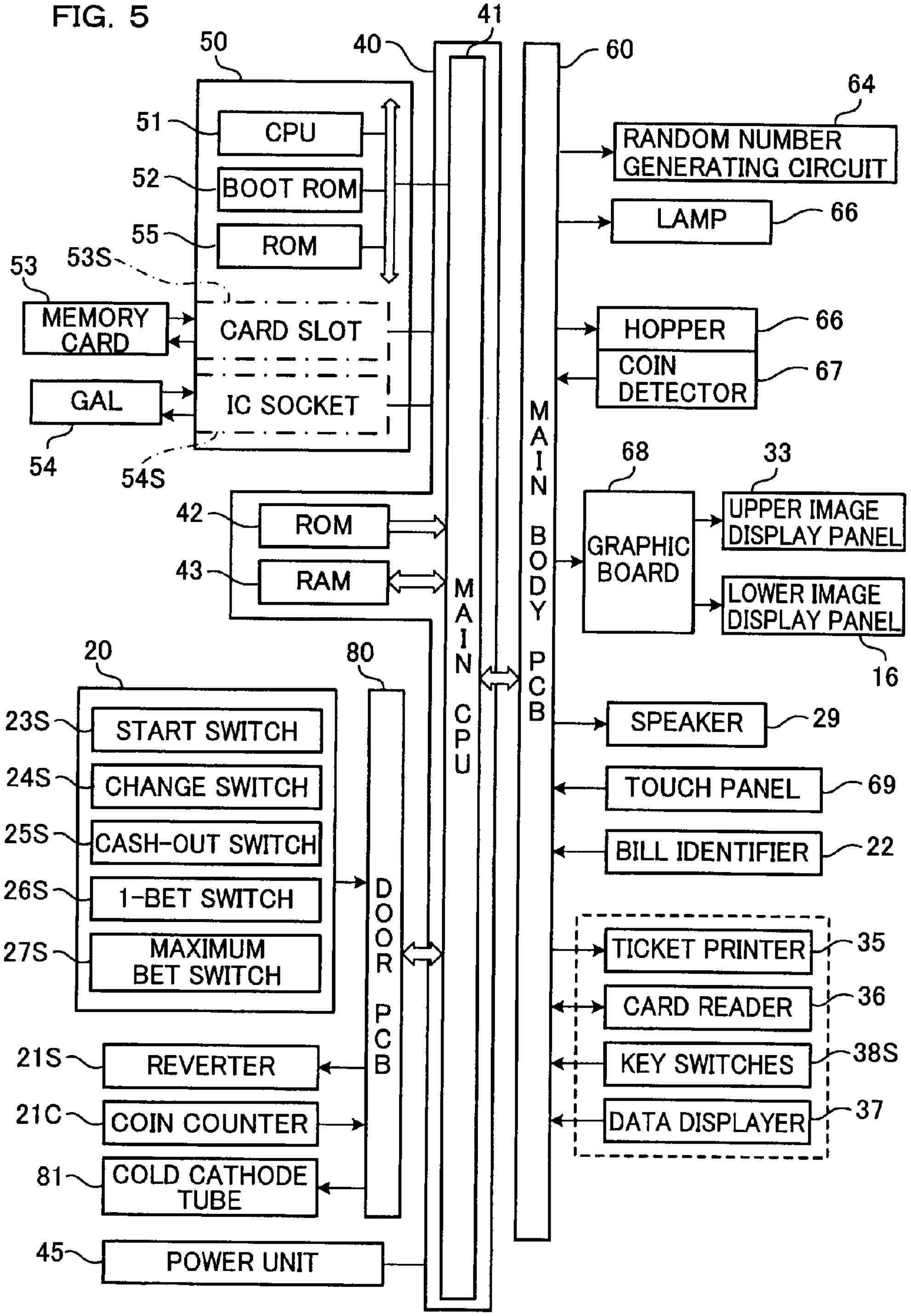
FIG. 5 is a block diagram illustrating a control circuit of the gaming machine.

FIG. 5 is a block diagram illustrating an internal structure of the slot machine 10 illustrated in FIG. 4. The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 is made of an involatile memory such as a compact flash (registered trademark) (a) or the like, and stores a game program. The game program includes a symbol determining program. The symbol determining program is a program for determining symbols to be rearranged on the display blocks 28.

The card slot 53S is structured so as to allow the memory card 53 to be attached/detached to/from the card slot 53S. This card slot 53S is connected to the motherboard 40 through an IDE bus. Thus, the type and content of a game run by a slot machine 10 can be modified by detaching the memory card 53 from the card slot 53S, write a different game program into the memory card 53, and inserting the memory card 53 back into the card slot 53S. The game program includes a program according to a game progress. This image data may be data of free game occurrence image 200, achievement effect image 201, free game addition image 202 or the like.

The game program includes odds data (see FIG. 14) and data of, for example, the following tables: a base game symbol table data (see FIG. 6), an additional wild symbol count determination table (see FIG. 12), an additional trigger symbol count determination table (see FIG. 13), and a symbol code No. determination table indicating the symbol column determination table (see FIG. 10). The base game symbol table indicates (i) a symbol of a display block forming a symbol column and (ii) a code No. and a random number associated with the symbol. The odds data indicates the number and types of symbols rearranged on a payline L and a corresponding payout amount.

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50.

The motherboard 40 is structured by using a marketed general-purpose motherboard which is a printed circuit board having basic components of a personal computer, and includes: a main CPU 41; a ROM (Read Only Memory) 42; and a RAM (Random Access Memory) 43. The motherboard 40 corresponds to the controller of the present invention.

The ROM 42 is made of a memory device such as a flash memory, and stores permanent data and a program such as BIOS (Basic Input/Output System) which is run by the main CPU 41. Running the BIOS by the main CPU 41 initializes predetermined peripherals and starts loading of a game program in a memory card 53 via the gaming board 50. Note that, in the present invention, the ROM 42 may be rewritable or non-rewritable.

The RAM 43 stores data used during operation of the main CPU 41 and a program such as a symbol determining program. Further, the RAM 43 is capable of storing a game program.

Further, the RAM 43 stores a credit amount, and an input amount and a payout amount for each game (unit game). Further, the RAM 43 stores data of a bonus game symbol table (see FIGS. 7, 8, and 9) or the like. The bonus game symbol table indicates (i) a symbol of a display block forming a symbol column and (ii) a code No. and a random number associated with the symbol. The bonus game is a type of bonus game and is also referred to as "feature game".

Further, the RAM 43 has a free game count recording region, a total game count recording region, a total payout amount recording region, and a trigger symbol count recording region. The trigger symbol is also referred to as "feature symbol". In the free game count recording region is stored remaining game data which indicates a remaining free game count T. In the total game count recording region is stored total game count data indicating a total game count C. The total game count C is the number of base games played after a transition to the insured mode. The trigger symbol count recording region stores trigger symbol count data indicating a trigger symbol count. The trigger symbol count is the total number of the trigger symbols that may be rearranged during a free game.

Further, the main RAM 43 is provided with a recording region for an insurance flag. The insurance flag is set when a rescue start condition is established. The insurance flag recording region is, for example, a recording region of predetermined bits, and the insurance flag is turned on and off according to contents of the recording region. The insurance flag in the on state corresponds to the insured mode. The insurance flag in the off state corresponds to the uninsured mode.

When the bonus game is run in the insured mode, an increase in the number of trigger symbols and/or that of wild symbols may be greater than the uninsured mode. Further, when a bonus combination is achieved during a bonus game, an increase in the number of trigger symbols and/or that of wild symbols may be greater in the insured mode than in the uninsured mode.

The motherboard 40 is connected to a later-mentioned main body PCB (Printed Circuit Board) 60 and a door PCB 80 via a USB. The motherboard 40 is also connected to the power supply unit 45.

To the main body PCB 60 and door PCB 80 are connected equipment and devices which generate input signals to be input to the main CPU 41 or which are controlled by control signals output from the main CPU 41. The man CPU 41 runs a game program stored in the RAM 43 based on an input signal input to the main CPU 41, thereby storing a result of a predetermined computation in the RAM 43 or transmitting control signals to the equipment and devices to control the same.

To the main PCB 60 are connected: a lamp 30, a hopper 66, a coin detector 67, a graphic board 68, a speaker 29, a touch panel, a bill validator 22, a ticket printer 35, a card reader 36, a key switches 38S, a data displayer 37, and a random number generating circuit 64. The lamp 30 flashes in a predetermined pattern, based on a control signal output from the main CPU 41.

The hopper 66 is installed inside the cabinet 11, and outputs a predetermined number of coins from the coin outlet 19 to the coin tray 18, based on a control signal output from the main CPU 41. The coin detector 67, when detecting that a predetermined number of coins is output from the coin outlet 19, outputs an input signal to the main CPU 41.

The graphic board 68 controls image display on the upper image display panel 33 and the symbol display device 16, based on a control signal output from the main CPU 41. On the upper image display panel 33 and display blocks 28 of the symbol display device 16 are displayed symbols which are scrolled and stopped. The credit amount display unit 400 of the symbol display device 16 displays thereon a credit amount stored in the RAM 43. Further, the bet amount display unit 401 of the symbol display device 16 displays the number of coins bet. Further, the payout display unit 402 of the symbol display device 16 displays the number of coins paid out. The graphic board 68 has a VDP (Video Display Processor) which generates image data based on control signal output from the main CPU 41, a video RAM which temporarily stores image data generated by the VDP, or the like. The image data used at the time of generating image data by the VDP is in a game program which is read out from the memory card 53 and stored in the RAM 43.

The bill validator 22 validates whether a bill is legitimate, and only receives a legitimate bill into the cabinet 11. The bill validator 22, when receiving a legitimate bill, outputs an input signal indicating the value of the bill to the main CPU 41. The main CPU 41 stores in the RAM 43 a credit amount corresponding to the value of the bill indicated by the input signal.

Based on a control signal from the main CPU 41, the ticket printer 35 prints on a ticket a barcode and outputs the ticket as a barcoded ticket 39. The barcode is encoded data containing the credit amount stored in the RAM 43, date, and the identification number of the slot machine 10. The card reader 36 reads out data from a smart card and transmits the data to the main CPU 41, or writes data into a smart card based on a control signal from the main CPU 41. The key switches 38S are provided to the keypad 38, and transmit a predetermined input signal to the main CPU 41 when a player operates the keypad 38. Based on a control signal from the main CPU 41, the data displayer 37 displays data read out by the card reader 36 or data input by the player through the keypad 38.

The random number generating circuit 64 generates a random number at a predetermined timing. Note that random numbers generated by the random number generating circuit 64 ranges from 0 to 65535.

The door PCB 80 is connected to a control panel 20, a reverter 21S, a coin counter 21C and a cold cathode tube 81. The control panel 20 is provided with a start switch 23S corresponding to the start button 23, a change switch 24S corresponding to the change button 24, a cashout switch 25S corresponding to a cashout button 25, 1-bet switch 26S corresponding to the 1-bet button 26, and a maximum bet switch 27S corresponding to the maximum bet button 27. Each of the switches 235 to 27S outputs an input signal to the main CPU 41 when corresponding one of the buttons 23 to 27 is operated by a player.

The coin counter 21C is provided inside the coin receiving slot 21, and validates whether a coin input by a player to the coin receiving slot 21 is legitimate coin. Any non-legitimate coin is output from the coin outlet 19. Further, the coin counter 21C, when detecting a legitimate coin, outputs an input signal to the main CPU 41.

The reverter 21S operates based on a control signal from the main CPU 41, and delivers coins that are recognized as legitimate by the coin counter 21C into a not-shown cash box or hopper 66 in the slot machine 10. That is, when the hopper 66 is full of coins, legitimate coins are delivered by the reverter 21S to the cash box. On the other hand, if the hopper 66 is not full of coins, legitimate coins are delivered to the hopper 66. The cold cathode tube 81 functions as a backlight disposed at the back sides of the symbol display device 16 and the upper display panel 33. This cold cathode tube 81 lights based on a control signal output from the CPU 41.

(Symbols, Combinations, or the Like)

Symbols displayed on the pseudo reels 151 to 155 of the slot machine 10 form symbol columns each including plural symbols 501. Each symbol 501 forming a symbol column is given any of the code Nos. 0 to 19 or more, as shown in FIGS. 6 to 9. Each symbol column has a combination of symbols 501 which are "WILD", "FEATURE", "A", "Q", "J", "K", "BAT", "HAMMER", "SWORD", "RHINOCEROS", "BUFFALO", and "DEER".

Any four consecutive symbols 501 of a symbol column are displayed (arranged) in the uppermost stage, upper stage, lower stage, and lowermost stage of the corresponding one of the pseudo reels 151 to 155, respectively, thereby forming a symbol matrix of five columns and four rows on the display window 150. Symbols 501 forming a symbol matrix are scrolled at least when the start button 23 is pressed to start a game. The scrolling of the symbols 501 stops (symbols 501 are rearranged), when a predetermined period elapses after the start of scrolling.

Further, for each symbol 501, various winning combinations are set beforehand. Each winning combination means a winning is achieved. A winning combination is a combination of symbols 501 stopped on the payline L, which is advantageous for a player. The wording "advantageous" means that: a predetermined number of coins according to the winning combination are paid out; the payout number of coins are added to the credit; a bonus game is started; or the like.

In the present embodiment, a winning combination is a combination of symbols 501 which is rearranged on an activated payline L and includes a predetermined number of at least one of the following symbols 501: "WILD", "FEATURE", "A", "Q", "J", "K", "BAT", "HAMMER", "SWORD", "RHINOCEROS", "BUFFALO", and "DEER". When a predetermined type of symbols 501 is set as a scatter symbol, a winning combination is regarded as to be formed if a predetermined number or more of scatter symbols are rearranged, irrespective of the activation/inactivation status of the paylines L.

Specifically, a winning combination with "FEATURE" (a trigger symbol 503*b*) stopped on a payline L serves as a bonus trigger and causes (i) transition of the gaming mode from the base game to the bonus game and (ii) a payout according to the bet amount. Further, when the winning combination includes a symbol 501 "BAT" stopped on the payline L during the base game, there is paid out an amount of coins (value) which is a product of a basic payout amount of "BAT" multiplied by the bet amount.

(Base Game Symbol Table)

FIG. 6 shows a table used for determining symbols 501 to be rearranged during a base game. The base game symbol table indicates a symbol 501 on a display block 28 forming a symbol column, a code No. associated with the symbol 501, and a number range associated with the code No. The number range is one of twenty ranges which cover 0 to 65535.

Note that the above numbers may be equally divided into twenty ranges or unequally divided into twenty ranges. The latter case enables adjustment of a winning possibility for each symbol 501 by adjusting the associated range of random numbers. Further, the range of random numbers associated with a specific symbol 503, i.e. "FEATURE" serving as the trigger symbol 503*b* or "WILD" serving as a wild symbol 503*a*, may be narrower than ranges of random numbers associated with other symbols 501. This allows easier adjustment of winning or losing, by adjusting the possibility of winning a valuable symbol 501.

For example, when a random number randomly selected for the first column is "10000", the symbol "J" whose code No. "3" is associated with a range of random numbers including "10000" is selected as a symbol to be rearranged in the first pseudo reel 151. Further, for example, when a random number randomly selected for the fourth column is "40000", the symbol "FEATURE" whose code No. "12" is associated with a range of random numbers including "40000" is selected as a symbol to be rearranged in the fourth pseudo reel 151.

(Bonus Game Symbol Table)

FIGS. 7 to 9 are tables each for use at the time of determining symbols 501 to be rearranged during a bonus game. It is noted that this table may be used for a game in the rescue process. As is the base game symbol table, the bonus game symbol table contains a symbol 501 of a display block 28 of a symbol column, a code No. associated with the symbol 501, and a number range associated with the code No. The number range covers 0 to 65535. These numbers 0 to 65535 are divided into the ranges as is the case of the base game symbol table.

Further, the bonus game symbol table includes additional specific symbols 503 or specific symbols 503 replacing the other symbols. The wording "replacing" means that new symbol data is written over already existing symbol data.

The number of additional symbols or the number of symbols replacing the other symbols, or the symbol column in which the addition or replacement takes place may be randomly determined or determined beforehand.

In the present embodiment, an increase is determined based on the additional wild symbol count determination table of FIG. 12 and the additional trigger symbol count determination table of FIG. 13. When symbol data is replaced with another set of symbol data, an image based on the overwritten data (replacement data) may be displayed, in place of a symbol 501 having been stopped and displayed.

For example, in the bonus game symbol table of FIG. 7, ten wild symbols 503*a* are evenly added to symbol columns (L1) to (L5). This achieves conditions whereby a wild symbols 503*a* is more likely to be selected through random selection, in all the symbol columns (L1) to (L5).

Further, for example, the bonus game symbol table of FIG. 8 is that of FIG. 7 with five trigger symbols 503*b* being added to at least the first symbol column (L1). This achieves conditions whereby a trigger symbols 503*b* is more likely to be selected through random selection, in the first symbol column (L1).

For example, the bonus game symbol table of FIG. 9 is the same as the table of FIG. 7 except in that a predetermined number of symbols are replaced with the wild symbols 503*a*. This achieves conditions whereby a wild symbol 503*a* is more likely to be selected through random selection, although odds table used is the same as that for the base game. Note that the replacement is done so that the fifth symbol column (L5) in FIG. 9 only includes specific symbols 503. A player therefore is encouraged by having a feeling that a specific symbol 503 is always selected through the random selection in the fifth symbol column (L5).

(Symbol Column Determination Table)

FIG. 10 illustrates a symbol column determination table used at the time of determining a symbol column, out of the symbol columns (L1) to (L5), in which addition of or replacement with the specific symbols 503 takes place. The symbol column determination table indicates a symbol column No. and a random number associated with the symbol column No. The symbol column No. 1 corresponds to the first column of the display blocks 28; the symbol column No. 2 to the second column of the display blocks 28; the symbol column No. 3 to the third column of the display blocks 28; the symbol column No. 4 to the fourth column of the display blocks 28; and the symbol column No. 5 to the fifth column of the display blocks 28.

The present embodiment deals with a case where an increase in the number of specific symbols 503 or the number of specific symbols 503 to replace the other symbols is determined for each symbol column based on the random number sampled and the symbol column determination table. The present invention however is not limited to this. For example, the number of specific symbols 503 increased or substituted may be determined in advance for each symbol column. Further, an increase in the number of specific symbols 503 or the number of specific symbols 503 to replace the other symbols may be determined for each type of the specific symbols 503. In addition to the above, when the rescue process is carried out, an increase in the number of specific symbols 503 or the number of specific symbols 503 to replace the other symbols may be larger than the number in the cases other than the rescue process.

(Code No. Determination Table)

FIG. 11 shows a code No. determination table. The code No. determination table indicates a code No. and a random number associated with the code No. For example, when the random numbers for the first symbol column No. (the first column) are 40567, 63535, 65323, then "12", "end", and "end" are selected as the code Nos., respectively.

The present embodiment deals with a case where the code Nos. of specific symbols to be increased is determined for each of the symbol columns based on the random numbers obtained and code No. determination table. The present invention however is not limited to this. For example, the code No. of a specific symbol 503 to be increased may be set in advance for each symbol column.

(Additional Wild Symbol Count Determination Table)

FIG. 12 shows an additional wild symbol count determination table. The additional wild symbol count determination table indicates a list of additional wild symbol counts and associated random numbers. The additional wild symbol count includes five numbers: "10", "30", "50", "70", and "90". For example, when the random number is 17235, the additional wild symbol count selected is "30". Note that the additional wild symbol count is not particularly limited provided that it includes plural types of increases which are at least 1. Further, the list of increases may be variable at a predetermined timing; e.g. at every unit game. It is noted that the additional wild symbol count determination table may be used when a rescue process is carried out to increase the number of wild symbols 503*a*.

(Additional Trigger Symbol Count Determination Table)

FIG. 13 shows an additional trigger symbol count determination table. The additional trigger symbol count determination table indicates a list of additional trigger symbol counts and associated random numbers. The additional trigger symbol count is selected from five numbers: "2", "4", "6", "8", and "10". For example, when the random number is 17235, the additional trigger symbol count selected is "4". Note that the additional trigger symbol count is not particularly limited provided that it includes plural types of increases which are at least 1. Further, the list of increases, in the table, may be variable at a predetermined timing; e.g. at every unit game. It is noted that the additional trigger symbol count determination table may be used when a rescue process is conducted to increase the number of trigger symbols 503*b*.

(Payout Table)

FIG. 14 is a payout table for managing payout awarded based on the winning combination. This payout table is stored in the ROM 242 of the main control board 71, and payout information (payout multiplying factor) is associated with each type of winning combination. For example, a payout multiplying factor corresponding to a winning combination including three "A" is "4". Therefore, a payout calculated by multiplying the bet amount by 4 is awarded to the player in this case. A payout multiplying factor corresponding to a winning combination including five "BUFFALO" is "100". Note that the payout multiplying factor for the base game is the same as that of the free game; however, the present invention is not limited to this. That is, the payout multiplying factor may be different between the base game and the free game.

(Rescue Setting Table)

FIG. 15 shows a rescue setting table which is provided for determining at least one of an additional rate and an added game repeat count corresponding to an average bet amount, and is used in a rescue process. This setting table is stored in the ROM 242 of the main control board 71. The rescue setting table includes an average bet amount list, an additional rate list, and an added game repeat count list.

The average bet amount list has five number ranges from the minimum bet amount "1" to the maximum bet amount "500". More specifically, the average bet amount list has the number ranges of "1 to 100", "101 to 200", "201 to 300", "301 to 400", and "401 to 500".

The additional rate list is associated with the average bet amount list. Rescue setting items of the additional rate are rates by which the above-described payout multiplying factor shown in FIG. 14 is multiplied, and increase a payout awarded to the player. More specifically, the average bet amount list has number ranges of "1.2", "1.4", "1.6", "1.8", and "2.0". According to the list, for example, the additional rate is "1.4" when the average bet amount is "151", and hence the quadruple of the payout multiplying factor which corresponds to the winning combination of three "A" is multiplied by 1.4. Therefore, the payout awarded to the player in this case is calculated by multiplying the bet amount by 4.8. When the average bet amount is "245", the additional rate is "1.6". Therefore 100-fold of the payout multiplying factor which corresponds to the winning combination of five "BUFFALO" is multiplied by 1.6.

The added game repeat count list is associated with the average bet amount list in the same manner as the additional rate list. Rescue setting items of the added game repeat count are game repeat counts which are added to predetermined fixed game repeat count such as "40 games", which are repeatedly carried out in the rescue process. More specifically, the added game repeat count list has number ranges of "10", "20", "30", "40", and "50". Therefore, when for example the average bet amount is "151", the added game repeat count is "20" and hence 20 is added to the fixed game repeat count. As a result, the player is allowed to play the free game 60 times in the rescue process.

(Display Status)

The following describes an exemplary display state of the symbol display device 16 in the operation of the slot machine 10.

(Base Game Screen: During Game)

FIG. 16 illustrates an exemplary base game screen which is a screen displayed on the symbol display device 16, during the base game.

More specifically, the base game screen is arranged in a central portion, and includes: a display window 150 having five pseudo reels 151 to 155, and payline occurrence parts 65L and 65R which are arranged on both sides of the display window 150 and symmetrical with respect to the display window 150. Note that FIG. 16 illustrates a base game screen in which first to third pseudo reels 151, 152, and 153 are stopped, while the fourth and fifth pseudo reels 154 and 155 are rotating.

Above the display window 150 are: a credit amount display unit 400, a bet amount display unit 401, a wild symbol count display unit 415, a trigger symbol count display unit 416, and a payout display unit 402. These units 400, 401, 415, 416, and 402 are sequentially arranged in this order from the left side to the right side of the player.

The credit amount display unit 400 displays a credit amount. The bet amount display unit 401 displays a bet amount in a unit game in progress. The wild symbol count display unit 415 displays the number of wild symbols 503*a* in a unit game in progress. With this, it is possible to notify the player in advance that there are five wild symbols 503*a* in the base game. The trigger symbol count display unit 416 displays the number of trigger symbols 503*b* in a unit game in progress. With this, it is possible to notify the player in advance that there are five trigger symbols 503*b* in the base game. The payout display unit 402 displays the number of coins to be paid out when a winning combination is achieved.

Below the display window 150 are: a help button 410; a pay-table button 411; a bet unit display unit 412; a stock display unit 413; and a free game count display unit 414. These units 410, 411, 412, 413, 414 are sequentially arranged in this order from the left side to the right side of the player.

The help button 410, when pressed by a player, activates a help mode. The help mode provides a player with information to solve his/her problem regarding the game. The pay-table button 411, when pressed by a player, activates a payout display mode in which an amount of payout is displayed. The payout display mode displays an explanatory screen indicating relation of a winning combination to the payout multiplying factor.

The bet unit display unit 412 displays a bet unit (payout unit) at the current point. With the bet unit display unit 412, the player is able to know that, for example, the minimum game value required to participate in a unit game is one cent, and that s/he is able to raise his/her bet in increments of one cent.

The stock display unit 413 displays the number of bonus games carried over. Here, the "number of bonus games carried over" means the remaining number of bonus games runnable subsequently to an end of the currently-run bonus game. That is, when the stock display unit 413 displays "3", three more bonus games are runnable after the currently-run bonus game. Note that "0" is displayed during the base game.

The free game count display unit 414 displays the total number of times the bonus game is to be repeated, and how many times the bonus game has been repeated. That is, when the free game count display unit 414 displays "0 OF 0", the total number of free games is 0; that is, the game running is not a bonus game. Further, when the free game count display unit 414 displays "5 OF 8" during the bonus game, the total number of free games is eight, and the current game in progress is the fifth free game.

Furthermore, between the bet unit display unit 412 and the stock display unit 413 is provided a rescue display unit 417. The rescue display unit 417 indicates, by changing a displayed color, the rescue process is in progress, stopped, or to be carried out soon. More specifically, the displayed color is blue when the rescue process is stopped. When the rescue process is to be carried out soon, i.e. when the rescue process is to be carried out after a predetermined number of games are played, the displayed color is yellow. When the rescue process is in progress, the displayed color is red.

(Bonus-Win Screen in Base Game)

Figure 17:
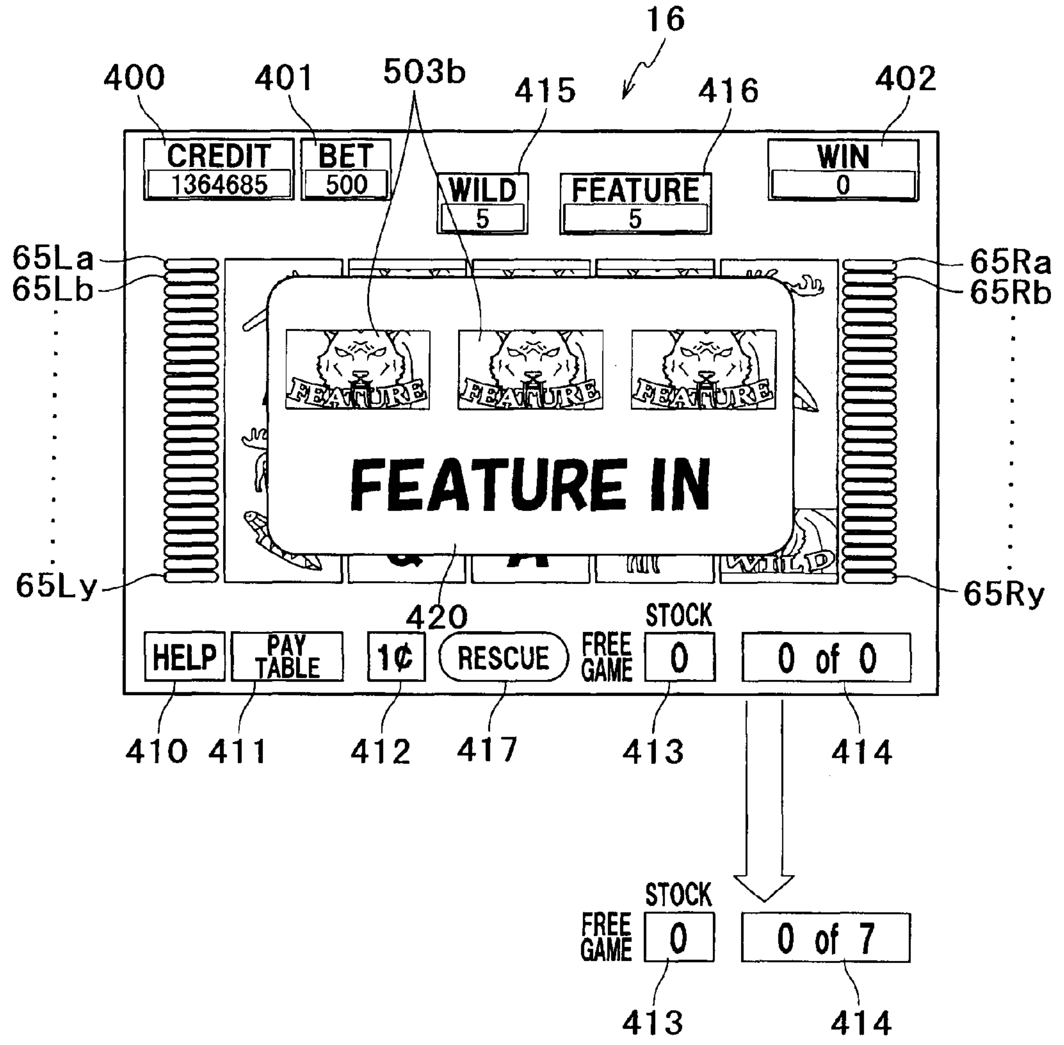
FIG. 17 is an explanatory diagram illustrating a display status of the symbol display device.

FIG. 17 shows a screen displayed for a predetermined period after a winning of bonus. More specifically, the base game screen shows that a bonus is won with three trigger symbols 503*b* being rearranged. The trigger symbol 503*b* preferably has a readable text such as "FEATURE", so as to have a player clearly understand that the symbol relates to winning of a bonus.

More specifically, the winning of bonus is notified by pop-up displaying a bonus-win screen 420. The bonus-win screen 420 notifies the winning of bonus by a symbol image and an image of text such as "FEATURE IN". Then, at the same time or immediately after the displaying of the bonus-win screen 420, the number "0" on the free game count display unit 414 is switched to "7". Thus, the player is able to know that s/he won a bonus, and that the game will transit to a bonus game in which the free game is repeated seven times.

(Bonus Game Screen: During Game)

Figure 18:
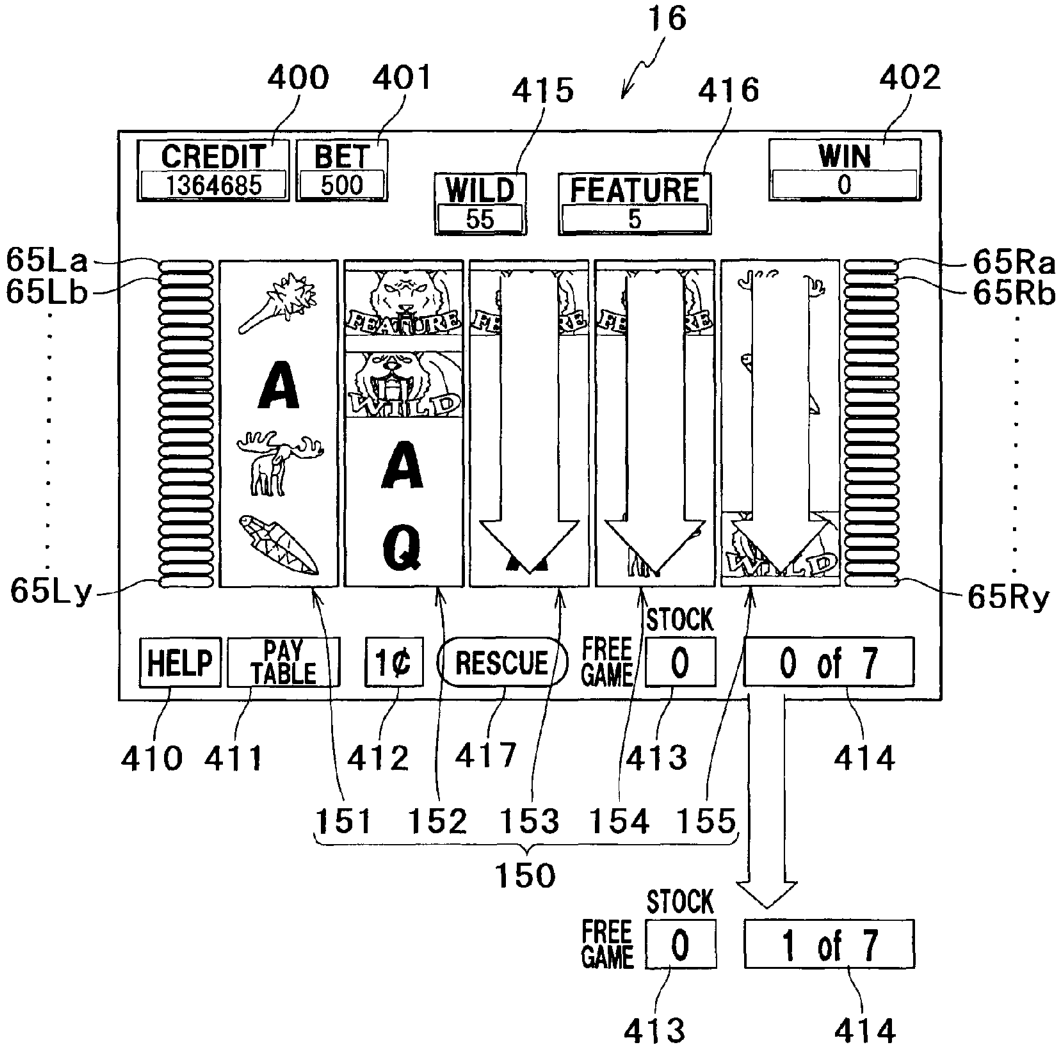
FIG. 18 is an explanatory diagram illustrating a display status of a symbol display device.

FIG. 18 illustrates an exemplary bonus game screen which is a screen displayed on the symbol display device 16, during the bonus game.

Specifically, the free game count display unit 414 displays the total number of free games and the current game repeat count. For example, the free game count display unit 414 indicates that the first free game out of seven free games is running. Other operations are the same as the base game.

(Rescue Start Screen)

Figure 19:
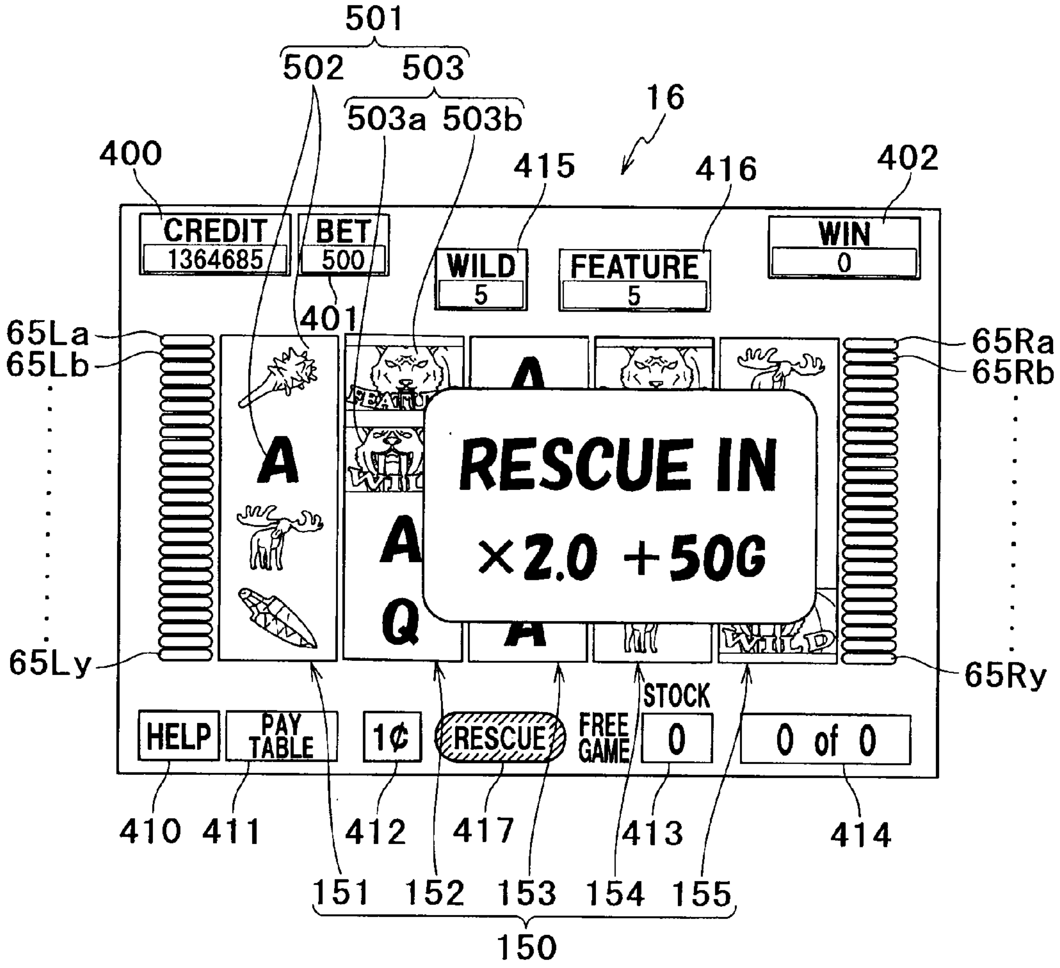
FIG. 19 is an explanatory diagram illustrating a display status of the symbol display device.

FIG. 19 shows a screen displayed when the rescue process starts. More specifically, this rescue start screen is displayed when a rescue start condition is established as the base game is repeated a predetermined number of times (equivalent to a rescue start value). On the rescue start screen, a rescue notification screen 425 pops up at a predetermined time. The rescue notification screen 425 displays: text information showing "RESCUE IN" to notify the start of the rescue process; payout multiplying factor information; and game repeat count information of a free game in the rescue process.

On the rescue notification screen 425, the rescue display unit 417 is displayed in yellow. The color of the rescue display unit 417 is switched from blue to yellow when the base game count has reached a predetermined number (notice setting value). This allows the rescue display unit 417 to notify the player that the rescue process will be carried out soon.

(Rescue Execution Screen)

Figure 20:
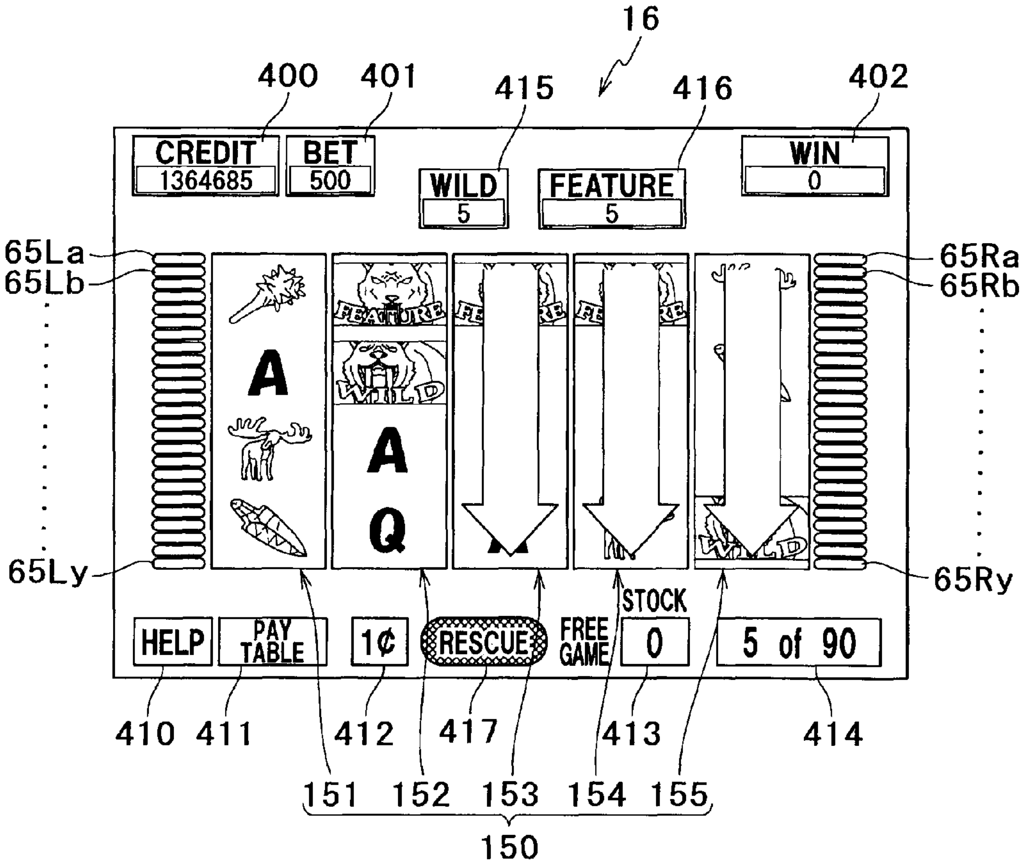
FIG. 20 is an explanatory diagram illustrating a display status of the symbol display device.

FIG. 20 shows a screen indicating that a free game in the rescue process is running. In this rescue execution screen, the rescue display unit 417 is in red color. This allows the player to recognize that the rescue process is in progress. The free game count display unit 414 displays the total game repeat count of the free game and the current free game count in the rescue process. That is to say, the display screen indicates in the free game count display unit 414 that the fifth free game out of 90 free games is running. This allows the player to play games while taking into consideration the remaining number of free games in the rescue process.

(Operations of Slot Machine 10: Base Game Running Process)

Figure 21:
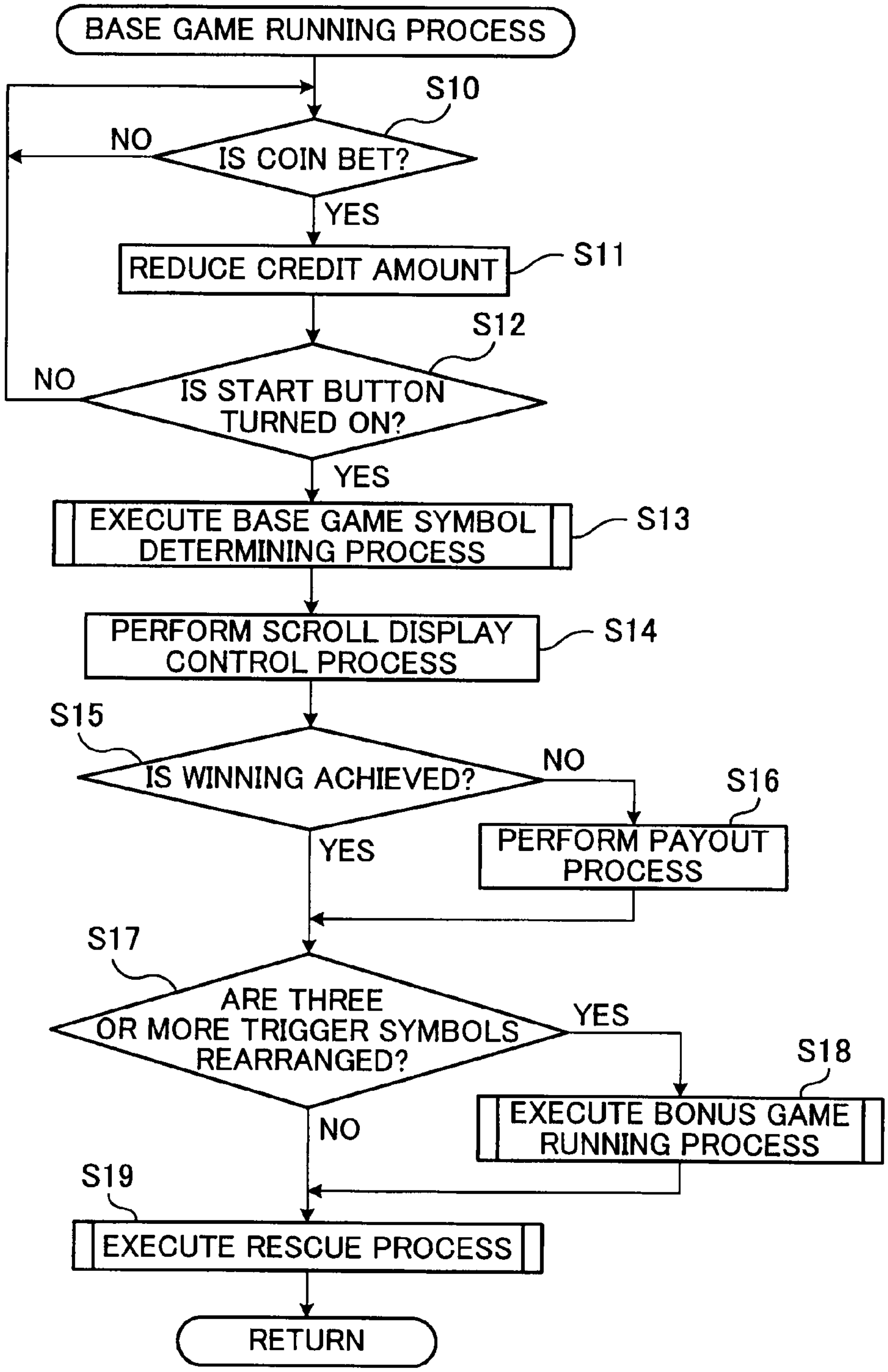
FIG. 21 is a flowchart illustrating a base game running process.

The following describes an operation of the slot machine 10 having the above structure, with reference to FIGS. 21 to 25. The base game running process shown in FIG. 21 is run by the main CPU 241 of the slot machine 10. One routine shown in FIG. 21 constitute a unit game. It is noted that the slot machine 10 has been activated in advance.

As shown in FIG. 21, the main CPU 41 determines whether a coin is bet (S10). In this process, the main CPU 41 determines whether an input signal is received. The input signal may be an input signal output from the 1-bet switch 26S when the 1-bet button 26 is operated, or an input signal output from the maximum bet switch 27S when the maximum bet button 27 is operated. When it is determined that no coin is bet, the process goes back to S10.

On the other hand in S10, if it is determined that a coin is bet, the main CPU 41 performs a process of reducing the credit amount stored in the RAM 43, by the amount of coins having been bet (S11). Note that when the number of coins bet surpasses the credit amount stored in the RAM 43, the process of reducing the credit amount in the RAM 43 is not performed and the process goes back to S10. Further, if the number of coins bet surpasses the maximum number of coins bettable in one game (500 coins in this embodiment), the process of reducing the credit amount in the RAM 43 is not performed and the process goes to S12.

Next, the main CPU 41 determines whether the start button 23 is pressed (S12). In this process, the main CPU 41 determines whether an input signal output from the start switch 23S is received, when the start button 23 is pressed. If it is determined that the start button 23 is not pressed, the process goes back to S10. Note that when the start button 23 is not pressed (e.g. when the start button 23 is not pressed and an instruction to end the game is input), the main CPU 41 cancels the result from the reduction in S11.

On the other hand in S12, if it is determined that the start button 23 is pressed, the main CPU 41 executes a base game symbol determining process (S13). In the base game symbol determining process, the main CPU 41 runs a symbol determining program stored in the RAM 43 to determine the code No. at the time of stopping the symbols. Specifically, the main CPU 41 obtains a random number, and determines the code No. at the time of stopping each symbol column formed by the display blocks 28, based on the random number obtained, and the base game symbol table of FIG. 6. The base game symbol determining process is detailed later with reference to the drawings.

As illustrated in FIG. 6, there are 14 wild symbols (also referred to as specific symbols in the base game symbol table. The wild symbol is a symbol substitutable for any symbol.

Next, in S14, the main CPU 41 performs a scroll display control process. As illustrated in FIG. 16, this process controls displaying so that symbols determined in S13 are rearranged after scrolling of symbols is started.

Next, the main CPU 41 determines whether winning is achieved (S15). In S15, the main CPU 41 counts the number of each type of symbols rearranged along the same payline L in S14. Then, the main CPU 41 determines if there is a counted value which equals or surpasses "2".

If it is determined that a winning is achieved, the main CPU 41 performs a process related to coin payout (S16). In this process, the main CPU 41 refers to the odds data stored in the RAM 43, and determines the payout multiplying factor based on the number of symbols rearranged along the payline L. The odds data is data indicating the number of symbols rearranged along a single payline L and the associated payout multiplying factor (see FIG. 14). Note that the payout is doubled every "WILD" arranged on a winning-achieved payline L. That is, if three "WILD" are displayed along the winning-achieved payline L, the payout is eight times as much of the original payout amount.

The present embodiment deals with a case where it is determined that a winning is achieved when symbols arranged along a single payline L includes at least two symbols of the same type. The present embodiment however is not limited to this. For example, the paylines may be omitted from the present invention, and it is possible to determine that a winning is achieved when symbols rearranged in the display blocks 28 includes at least two symbols of the same type.

When it is determined that a winning is not achieved in S15, or after the process of S16, the main CPU 41 determines whether three or more trigger symbols 503*b* are rearranged (S17). In this process, whether or not three or more trigger symbols 503*b* are rearranged in the display blocks 28 is determined, without taking into consideration the paylines L. In S17, if it is determined that three or more trigger symbols 503*b* are rearranged as illustrated in FIG. 17, the main CPU 41 executes the bonus game running process (S18). In the bonus game running process, the free game is run with an increased number of the wild symbols. The bonus game running process is detailed later.

When it is determined that the number of trigger symbols 503*b* rearranged is less than three in S17, or after the process of S18, the main CPU 41 executes a rescue process (S19). This rescue process will be detailed later. After the process of S19, the main CPU 41 ends this sub routine.

Figure 22:
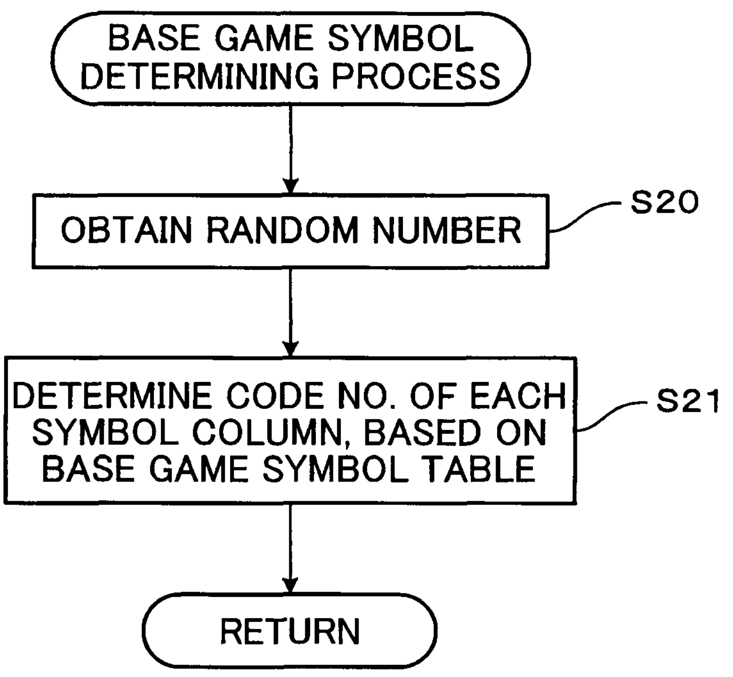
FIG. 22 is a flowchart of a base game symbol determining process.

FIG. 22 is a flowchart showing a sub routine of the base game symbol determining process. This process is executed by the main CPU 41 running a symbol determining program stored in the RAM 43. First the main CPU 41 obtains the random number from the random number generating circuit 64 (S20). In this process, the main CPU 41 obtains five random numbers corresponding to the symbol columns of the display blocks 28.

Next, the main CPU 41 determines the code No. of the symbol column of the display block 28, at the time of stopping the symbols, based on the five random numbers obtained and the base game symbol table (S21). For example, when the random number for the first column is 23035, the code No. for the first column is 07. Note that the code No. of a symbol column corresponds to a code No. of a symbol rearranged in the first row of the display blocks 28, amongst those arranged in four rows. After the process of S21, the main CPU 41 ends this sub routine.

The present embodiment deals with a case where the random number generating circuit 64 is provided and a random number (so-called hardware random number) is sampled from the random number generating circuit. However, the present invention may be adapted so that a random number is generated in a program (so called software random number).

Figure 23:
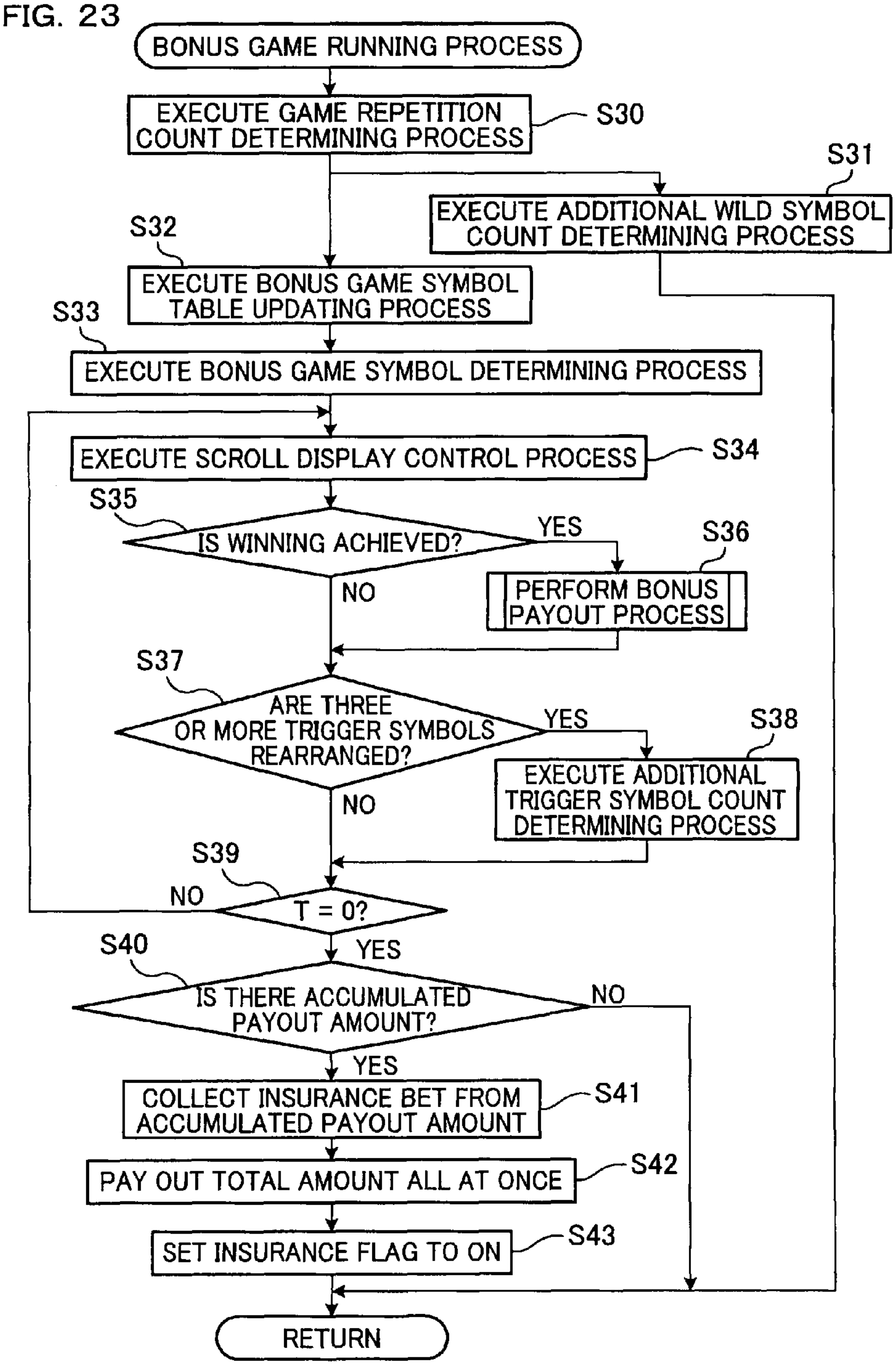
FIG. 23 is a flowchart of a bonus game running process.

Next, the following describes a bonus game running process, with reference to FIG. 23. FIG. 23 is a flowchart showing a sub routine of the bonus game running process. A bonus game is a game which allows the player to play without requiring a bet of a coin. First, the main CPU 41 sets a remaining free game count T to $T=F_1$ (=specific number of times=7) in the free game count recording region of the RAM 43 (S30). Further, the main CPU 41 causes pop-up displaying of a bonus-win screen 420 on the symbol display device 16, as illustrated in FIG. 17.

Next, the main CPU 41 executes an additional wild symbol count determining process (S31). More specifically, when three or more trigger symbols 503*b* are rearranged, a random number is first obtained. Then, a total increase in the number of wild symbols is determined based on that random number and the additional wild symbol count determination table. Thereafter, the number of wild symbols is increased at once or stepwise.

Further, the main CPU 41 executes a bonus game symbol table updating process (S32). In the bonus game symbol table updating process, the main CPU 41 updates the bonus game symbol table based on an increase in the number of wild symbols determined in the additional wild symbol count determining process. The bonus game symbol table updating process is detailed later with reference to the drawings.

Next, the main CPU 41 executes a bonus game symbol determining process (S33). In the bonus game symbol determining process, the main CPU 41 determines a code No. at the time of stopping the symbols, by running a symbol determining program stored in the RAM 43. More specifically, the main CPU 41 obtains a random number, and determines the code No. of each symbol column of the display blocks 28, at the time of stopping the symbols, based on the random number obtained, and the bonus game symbol table.

Next in S34, the main CPU 41 executes a scroll display control process as illustrated in FIG. 18. This process is a display control whereby scrolling of symbols is started and symbols determined in S33 are rearranged thereafter.

Next, the main CPU 41 determines whether winning is achieved (S35). In the present embodiment, a winning is achieved when symbols rearranged along a payline L includes at least two symbols of the same kind. The "WILD" which is the wild symbol is a symbol substitutable for any type of symbol. In the bonus game, the number of wild symbols is increased compared to that of the base game. Therefore, the possibility of winning is higher. In S35, the main CPU 41 counts the number of each type of symbols rearranged along the same payline L in S34. Then, the main CPU 41 determines if there is a counted value which equals or surpasses "2".

If it is determined that a winning is achieved, the main CPU 41 performs a process related to coin payout (S36). As discussed later, the payout of each free game is stored as an accumulated payout amount, and payout of coins is carried out at once after the bonus game is finished.

When it is determined that a winning is not achieved in S35, or after the process of S36, the main CPU 41 determines whether three or more trigger symbols 503*b* are rearranged (S37). In this process, whether or not three or more trigger symbols 503*b* are rearranged in the display blocks 28 is determined, without taking into consideration the paylines L. In S38, if it is determined that the number of trigger symbols 503*b* rearranged is three or more, then the CPU 41 executes the additional trigger symbol count determining process, adds "1" to the bonus game stock number (carry-over number), and displays the stock number on the bonus game stock display unit 413.

Next, the main CPU 41 determines whether the remaining count (T) is "0", based on the remaining game data stored in the free game count recording region of the RAM 43 (S39). If it is determined that the remaining game count (T) is not "0", the main CPU 41 brings the process back to S34. On the other hand, if it is determined that the remaining game count (T) is "0", the main CPU 41 proceeds to S40 on condition that the carry-over number of the bonus game is "0". If the bonus game carry-over number is not "0", the bonus game is run until the carry-over number is "0".

When the bonus game is finished, it is then determined whether the accumulated payout amount exists (S40). If the accumulated payout amount does not exist (S40, NO), the main CPU 41 ends the routine. On the other hand, if the accumulated payout amount exists (S40, YES), an insurance bet is taken from the accumulated payout amount (S41). This insurance bet is arranged to be equal to the lowest bonus payout among the bonus payouts corresponding to the symbols 501, which payouts may be awarded in the bonus game. This makes it possible to prevent the occurrence of a case where an insurance bet cannot be done because the bonus payout is not large enough to allow the insurance bet to be collected therefrom.

Thereafter, the bonus payout corresponding to the accumulated payout amount is awarded at once (S42). As such, a bonus payout which is awarded at once after the bonus game is finished is often large. In this case, the player does not easily notice that the bonus payout is reduced because the insurance bet has been collected from the bonus payout. As a result, the insurance bet is likely to be automatically carried out by using the bonus payout, without being noticed by the player. In other words, the switching from the uninsured mode to the insured mode is likely to be automatically carried out without being noticed by the player.

Thereafter, the insurance flag is changed to the on state (S43), and the main CPU 41 ends the routine.

Figure 24:
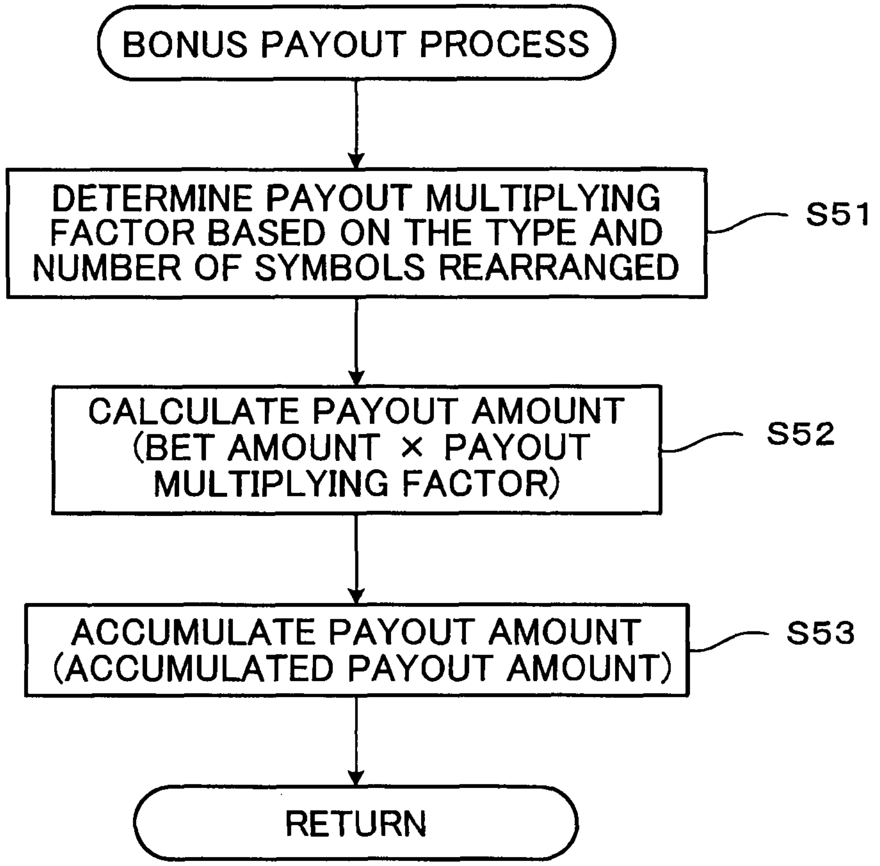
FIG. 24 is a flowchart of a bonus payout process.

Next, the following describes a bonus payout process, with reference to FIG. 24. FIG. 24 is a flowchart showing a sub routine of the bonus payout process carried out in the bonus game running process.

When the bonus payout process is carried out, a payout multiplying factor is determined with reference to the payout table of FIG. 14 and in accordance with the symbols 501 and the rearranged number (S51). Then a payout amount is calculated by multiplying the bet amount of the current free game by the payout multiplying factor (S52). Thereafter, the payout amount is accumulated as an accumulated payout amount, and the accumulated payout amount is paid out at once after the bonus game is finished (S53).

Figure 25:
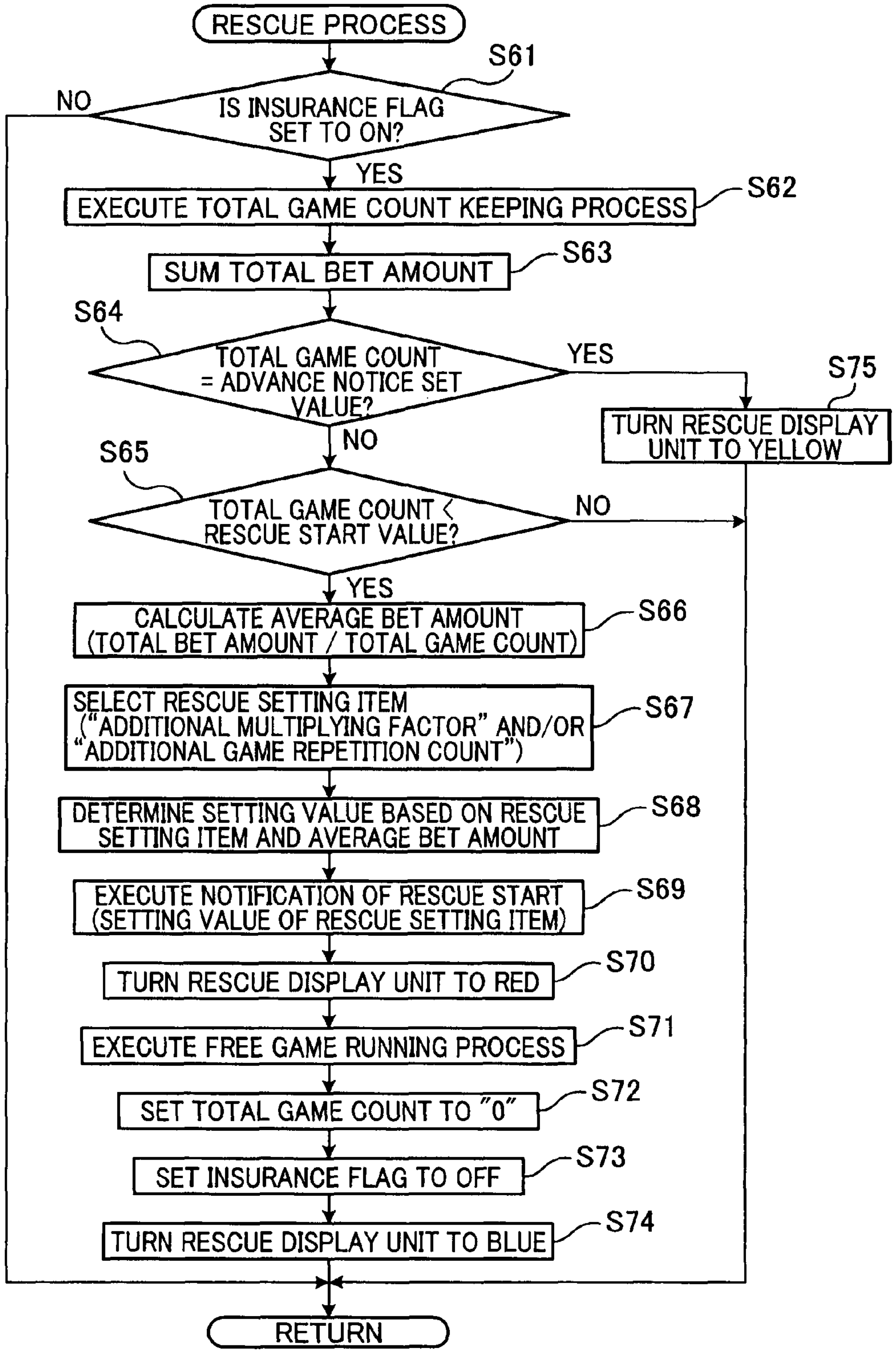
FIG. 25 is a flowchart of a rescue process.

Next, the following describes a bonus payout process, with reference to FIG. 25. FIG. 25 is a flowchart of a sub routine of the rescue process carried out in the base game running process.

First, whether an insurance flag is in the on state is determined (S61). If the insurance flag is not in the on state (S61, NO), it is determined that an insurance bet has not been done, i.e. a uninsured mode has been set and the main CPU ends the routine.

On the other hand, if the insurance flag is in the on state (S61, YES), it is determined that an insurance bet has been done, i.e., an insured mode has been set, and a process to counts up the total game count is carried out (S62). In other words, each time a base game is run, "1" is added to a total game count recording region. As a result, the number of repetition of the base game is obtained from the total game count. Thereafter, a process to add the total bet amount is carried out (S63). That is to say, each time a base game is run, a bet amount which is bet on the base game is added to a total bet amount recording region (S63).

Thereafter, whether the total game count matches with the notice setting value is determined (S64). If matched (S64, YES), the color of the rescue display unit 417 is changed from blue to yellow (S75), and the main CPU ends the routine. This allows the player to notice that a rescue process will start soon even if s/he has continuously failed to win in the base games.

On the other hand, if the total game count does not mach with the notice setting value (S64, NO), then whether the total game count matches with a rescue start value (S65). If not matched (S65, NO), the main CPU ends the routine. On the other hand, if matched (S65, YES), an average bet amount is calculated by subtracting the total game repeat count from the total bet amount (S66). Then a rescue setting item is randomly selected with reference to a rescue setting item table shown in FIG. 15. In other words, at least one of the additional rate and the added game repeat count is randomly selected (S67).

Thereafter, a setting value for the rescue process is determined based on the selected rescue setting item and average bet amount. That is to say, when the selected rescue setting item is the additional rate, the additional rate is "1.4" if the average bet amount is "151", for example. Therefore, when three "A" are rearranged, the quadruple of the payout multiplying factor corresponding to the winning combination is multiplied by "1.4". Therefore, the setting value of the rescue process in this case is a payout multiplying factor calculated by multiplying the bet amount by 4.8.

In the meanwhile, when the selected rescue setting item is the added game repeat count, the added game repeat count is "20" if the average bet amount is "151", for example. As a result, the setting value of the rescue process is a game repeat count calculated by adding 20 to the fixed game repeat count.

Thereafter, a notification of rescue start is displayed as shown in FIG. 19 (S69). At the same time, the selected rescue setting item is also displayed. This allows the player to recognize that the rescue process will start and what kind of rescue process will be carried out.

Subsequently, the color of the rescue display unit 417 is changed from yellow to red (S70). This allows the player to always recognize that the rescue process is in progress. Then a free game running process is carried out to repeat the free game corresponding to the setting value of the rescue process (S71). When the rescue process ends, the total game count is set to "0" (S72) and the insurance flag is changed to the off state to indicate the uninsured mode (S73). Subsequently, after the color of the rescue display unit 417 is changed from red to blue (S74), the main CPU ends the routine.

Embodiment 2

Now, the following will describe a gaming machine 300 in which plural slot machines 10 are connected to be able to exchange data, so as to form a multiplayer gaming machine as a whole. In this embodiment, the same components as in Embodiment 1 are denoted by the same reference numerals, respectively, and the description thereof will be omitted.

(System Structure of Gaming Machine 300)

Figure 26:
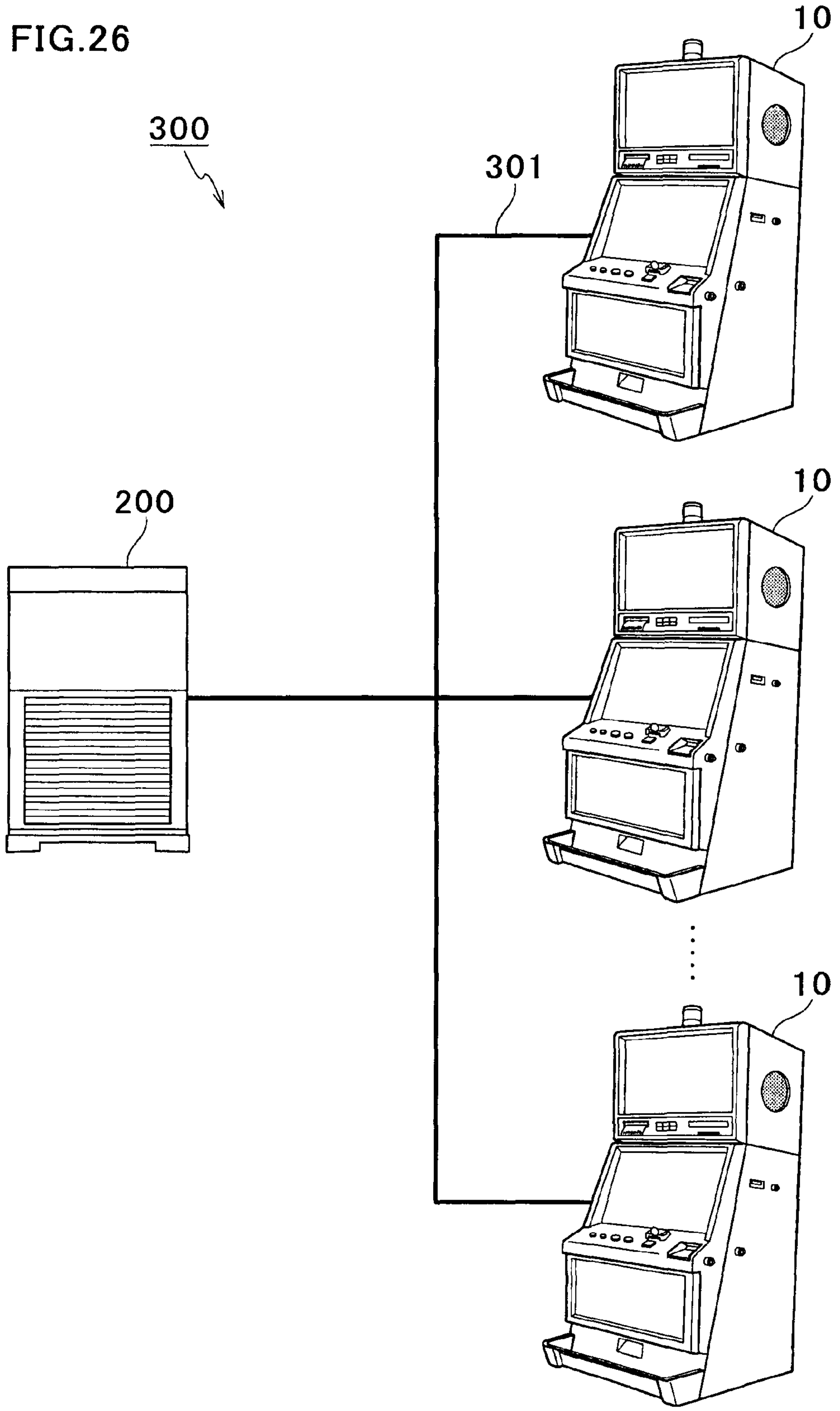
FIG. 26 is a schematic diagram illustrating a system of the gaming machine.

The gaming machine 300 includes plural slot machines 10, and an external controller 200 connected to the slot machines 10 via a communication line 301, as shown in FIG. 26.

The external controller 200 is for controlling the slot machines 10. In the present embodiment, the external controller 200 is a so-called hall-server provided in a gaming facility having plural slot machines 10. Each slot machine 10 is given a unique identification number. The external controller 200 identifies the source of data from any slot machine 10, by referring to the identification number. The identification number is also used for designating the destination, when transmitting data from the external controller 200 to any slot machine 10.

Note that the gaming machine 300 may be built in plural gaming facilities or a single gaming facility such as a casino where various games are provided. Further, when building the gaming machine 300 in a single gaming facility, the system of the gaming machine 300 may be built in each floor or each section of the gaming facility. The communication line 301 may be wired or wireless. For example, an exclusive line, switched line, or the like may be adopted.

(Specific Structure of Gaming Machine 300)

Next, the following describes the specific structure of the gaming machine 300.

Figure 27:
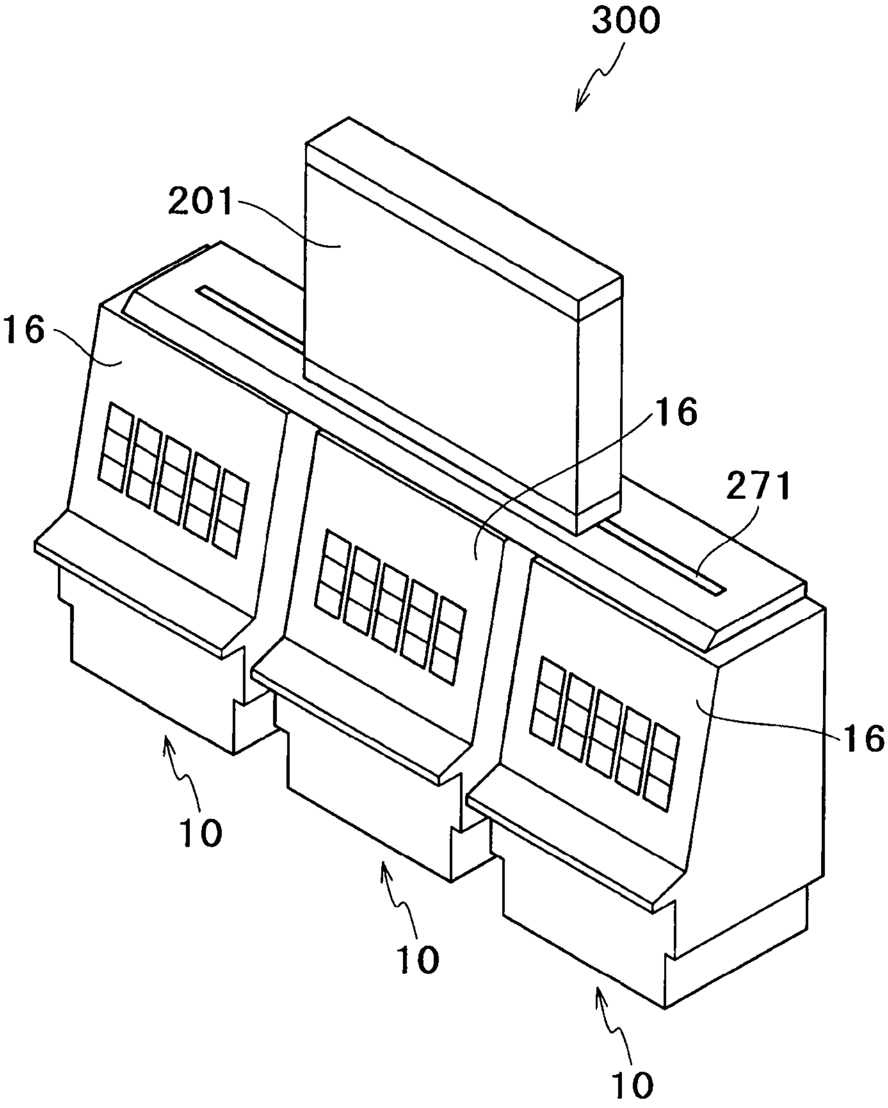
FIG. 27 is a perspective view illustrating the entire gaming machine.

As illustrated in FIG. 27, the gaming machine 300 has a shared display 201, a rail 271, a not-shown drive motor, and the not-shown external controller 200. The shared display 201 is connected to and in communication with the slot machines 10 each of which is a terminal device capable of running a game independently of the others. This shared display 201 displays an image related to a shared game. The rail 271 and the drive motor moves the shared display 201 to immediately above any of the slot machines 10.

The external controller 200 shown in FIG. 26 includes a rescue setting table shown in FIG. 15 and an insurance management table shown in FIG. 28. The insurance management table is for managing the state of the insurance flag in each slot machine 10, the state of the total frequency of betting, and the state of the total bet amount. More specifically, the table includes a machine number list, an insurance flag list, a total betting frequency list, and a total bet amount list. The machine number list stores sets of number data being unique to the respective slot machines 10. The insurance flag list stores flag data indicating whether the insurance flag is in the on state or the off state. The total betting frequency list stores the number of repetition of a base game. The total bet amount list stores the sum total of bet amounts bet on the base game.

Figure 29:
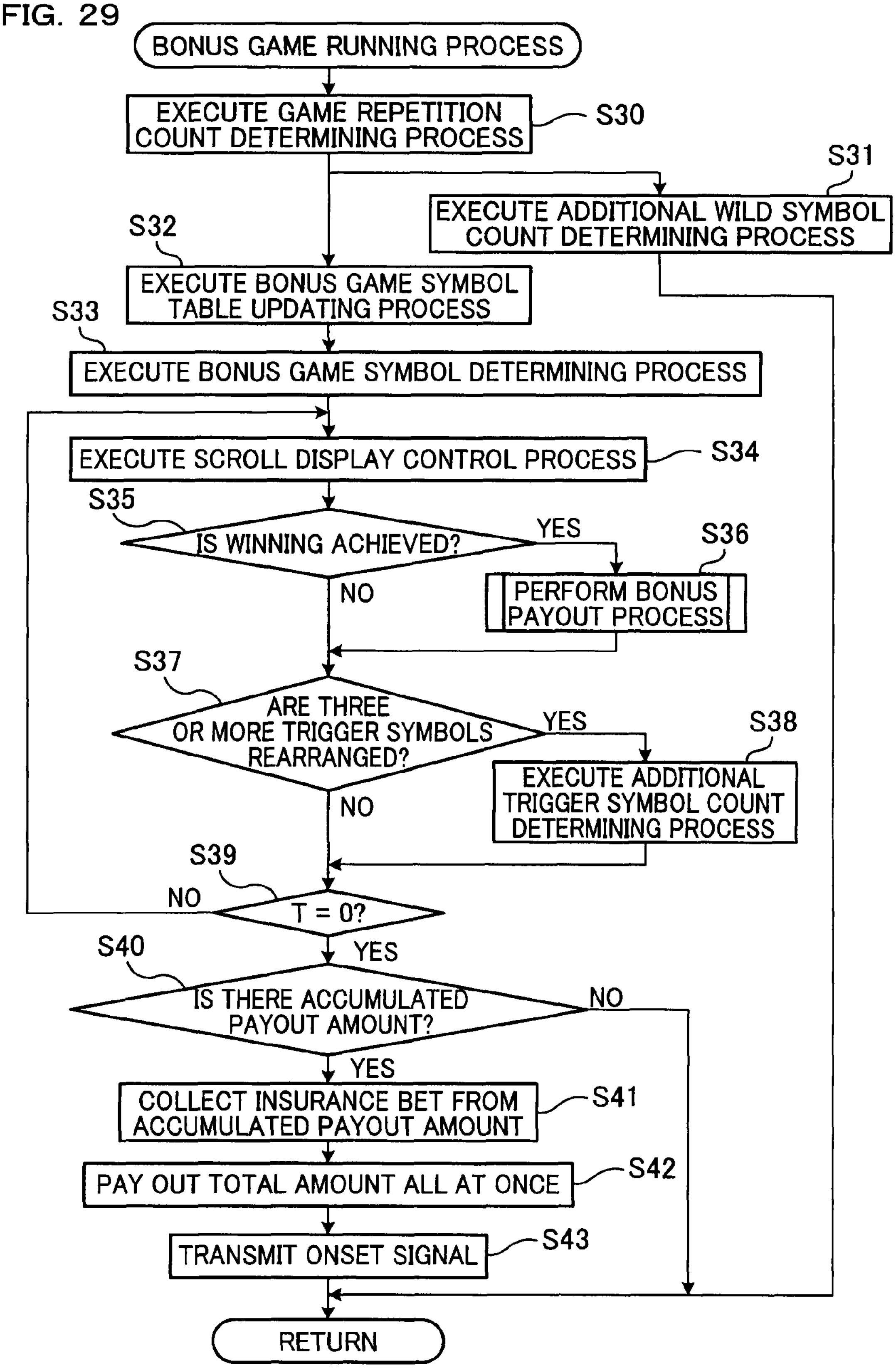
FIG. 29 is a flowchart of a bonus game running process.

The operation of the gaming machine 300 arranged as above will be described. First, each slot machine 10 executes a base game running process identical with the process shown in FIG. 21. When the bonus running process starts, as shown in FIG. 29, an insurance bet is collected after the bonus game ends (S41). After the payout is carried out at once (S42), an onset signal is transmitted to the external controller 200 (S143). It is noted that the operations in S30 to S42 are identical with those in the bonus running process shown in FIG. 23.

Figure 30:
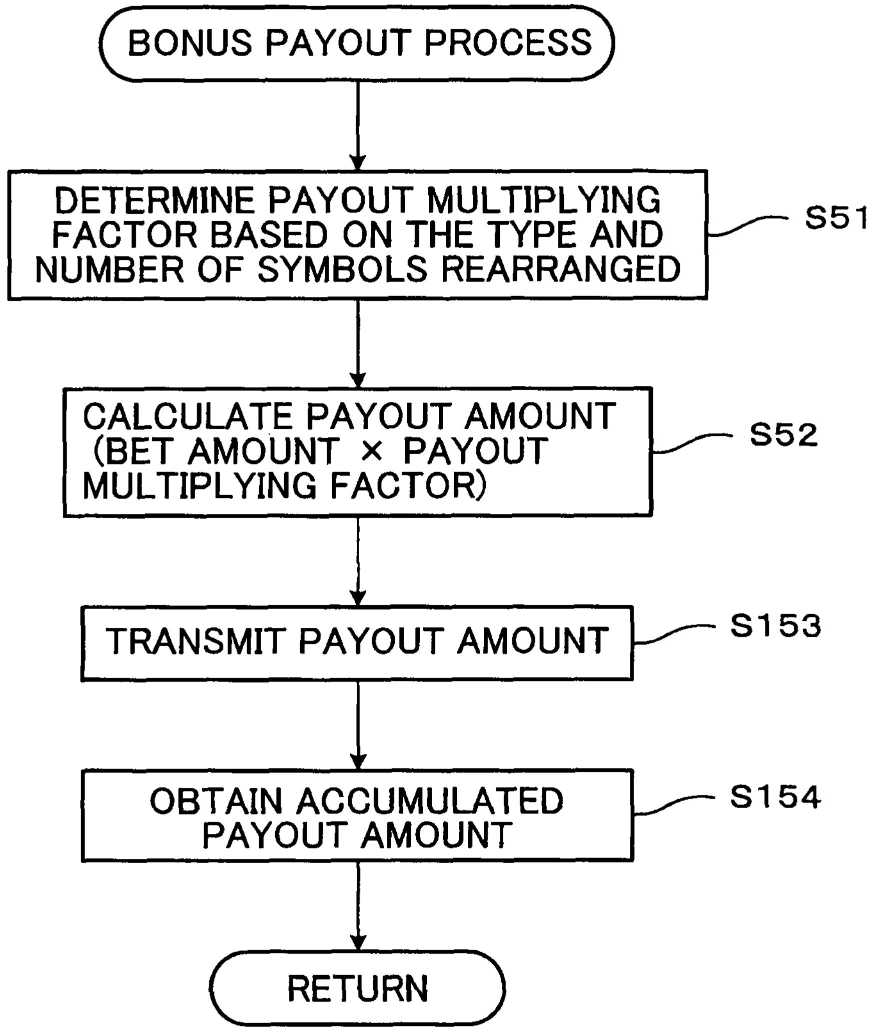
FIG. 30 is a flowchart of a bonus payout process.

Furthermore, as shown in FIG. 30, in the bonus payout process of the bonus running process, after a payout amount is calculated (S52), an information signal indicating the payout amount is transmitted to the external controller 200 (S153). Thereafter, an accumulated payout amount is obtained from the information signal transmitted from the external controller 200 (S154). It is noted that the operations in S51 and S52 are identical with those in the bonus running process of FIG. 24.

Figure 31:
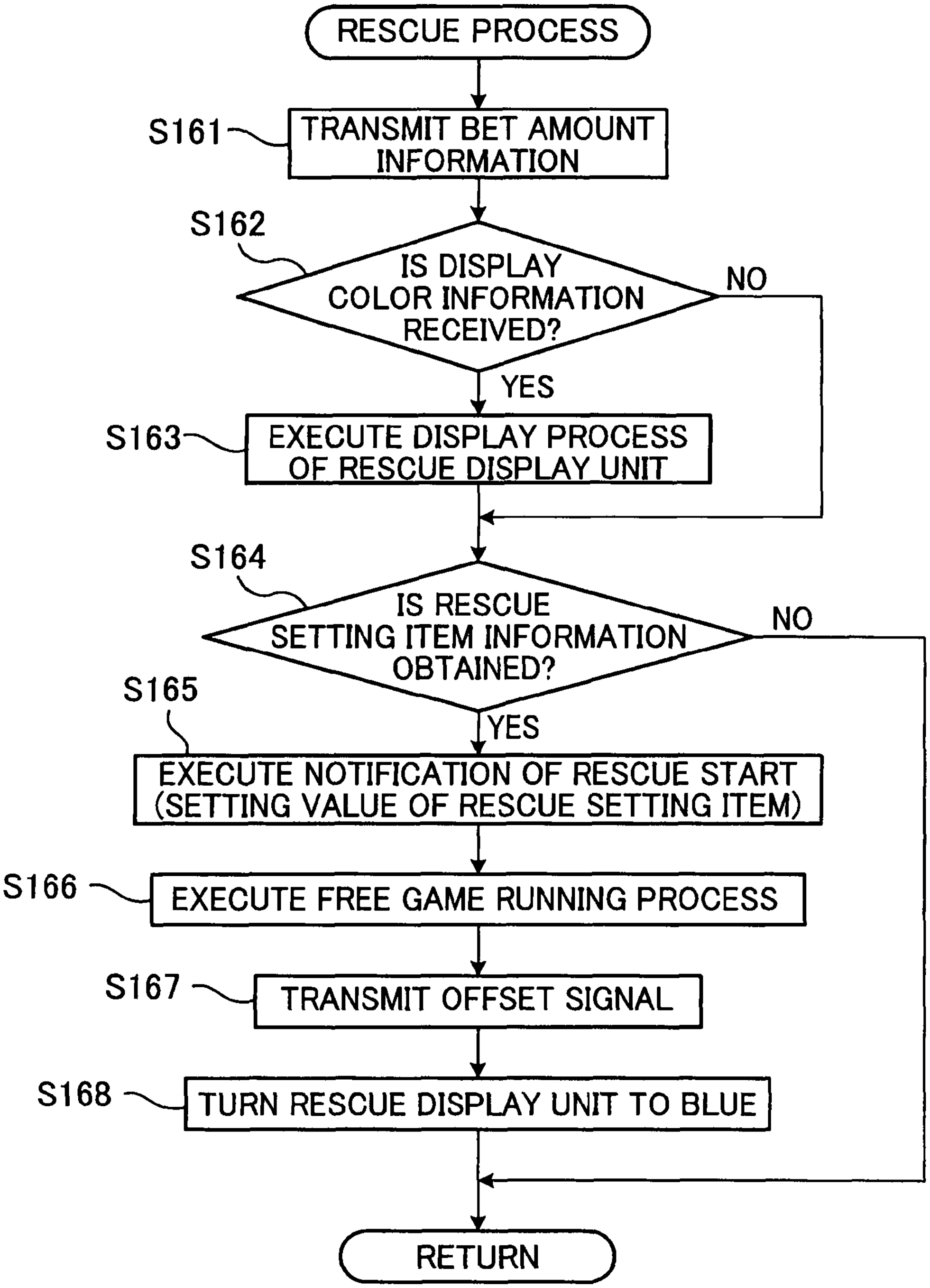
FIG. 31 is a flowchart of a rescue process.

Furthermore, as shown in FIG. 31, each slot machine 10 executes the rescue process when the rescue start condition is established in the base game process.

More specifically, bet amount information is transmitted to the external controller 200 (S161). Then, whether displayed color information has been obtained is determined by determining whether the displayed color information has been transmitted from the external controller 200 to the slot machine 10 receiving that displayed color information (S162). When the displayed color information has not been obtained (S162, NO), the routine shifts to S164. On the other hand, when the displayed color information has been obtained (S162, YES), a process to display the rescue display unit 417 is carried out, and the rescue display unit 417 is displayed in blue for example (S163), and then S164 is carried out.

Thereafter, whether rescue setting item information to the above-described slot machine 10 has been obtained is determined (S164). When the rescue setting item information to the above-described slot machine 10 has not been obtained (S164, NO), the main CPU ends the routine. On the other hand, when the rescue setting item information to the above-described slot machine 10 has been obtained (S164, YES), notification of rescue start is displayed as shown in FIG. 19 (S165). Thereafter, a free game running process is carried out as a rescue process (S166). After the rescue process ends, an offset signal is transmitted to the external controller 200 (S117). After the rescue display unit 417 is changed to blue and displayed (S168), the main CPU ends the routine.

When each slot machine 10 operates as above, the external controller 200 operates as below while performing data communications with each slot machine 10.

Figure 32:
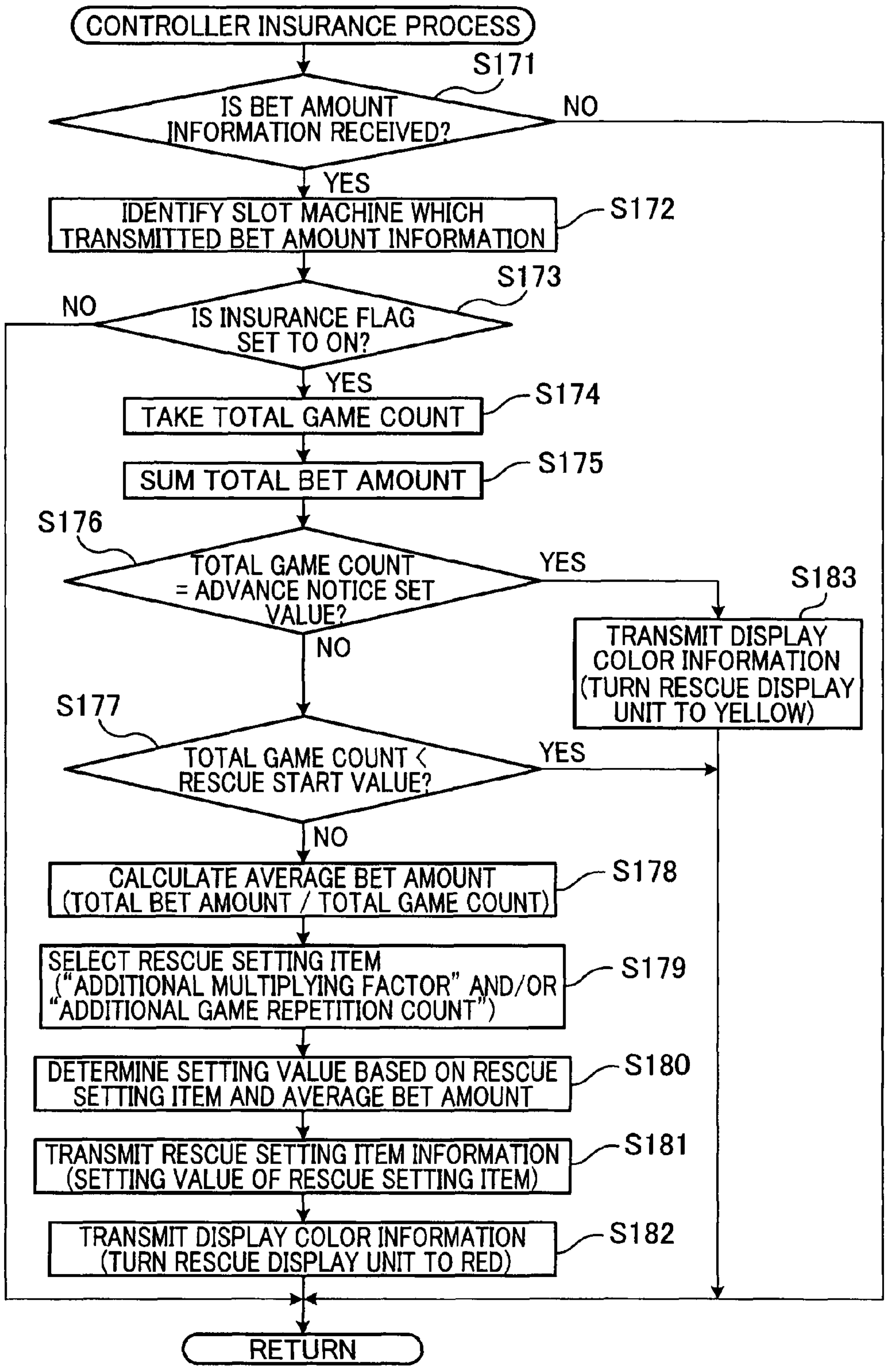
FIG. 32 is a flowchart of a controller insurance process.

First, as show in FIG. 32, whether bet amount information has been received from each slot machine 10 is determined (S171). When the bet amount information has not been received (S171, NO), the CPU of the external controller 200 ends the routine. On the other hand, when the bet amount information has been received (S171, YES), the sender of the bet amount information is specified (S172). Thereafter, with reference to an insurance management table of FIG. 28, whether the insurance flag corresponding to the machine number of the sender is in the on state is determined (S173). When the flag is not in the on state (S173, NO), the CPU of the external controller 200 ends the routine. On the other hand, when the flag is in the on state (S173, YES), the total game count is counted up (S174), and the total bet amount is added up (S175).

Thereafter, whether the total game count matches with the notice setting value is determined (S176). When matched (S176, YES), the displayed color information indicating yellow color is transmitted to the slot machine 10 which is the sender. On the other hand, when the total game count does not match with the notice setting value (S176, NO), whether the total game count is less than the rescue start value is determined (S177). When the total game count is less than the rescue start value (S177, YES), the CPU of the external controller 200 ends the routine.

On the other hand, when the total game count is not less than the rescue start value (S177, NO), an average bet amount is calculated (S178) and a rescue setting item is randomly selected (S179). Thereafter, a setting value is determined based on the rescue setting item and the average bet amount (S180). It is noted that the steps (S177 to S180) above are identical to S65 to S68 shown in FIG. 25. Subsequently, after the displayed color information indicating red color is transmitted to the slot machine 10 which is the sender (S182), the CPU of the external controller 200 ends the routine.

Figure 33:
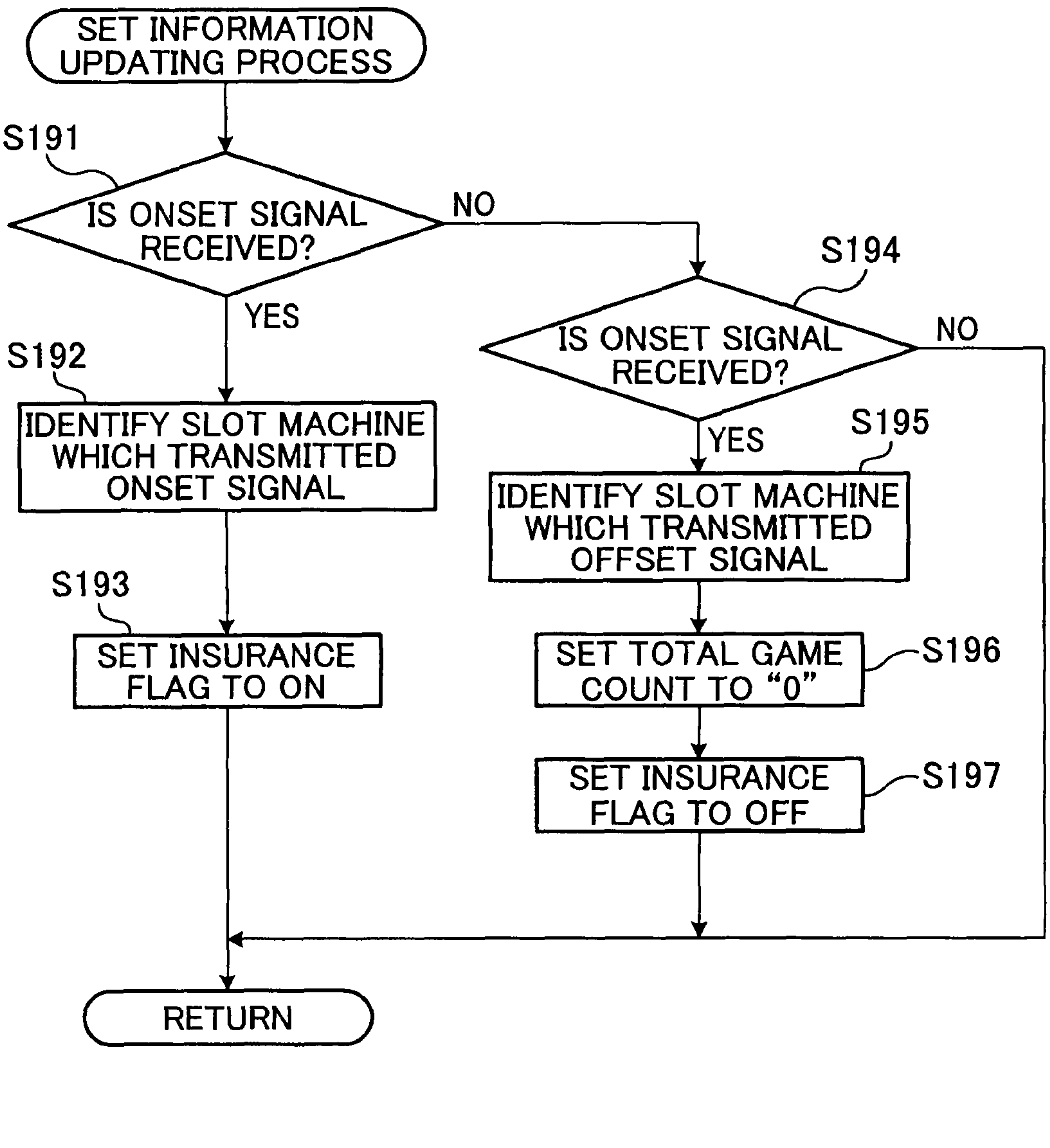
FIG. 33 is a flowchart of a setting information updating process.

In addition to the above, the external controller 200 carries out the setting information updating process shown in FIG. 33, in parallel to the execution of the aforesaid controller insurance betting process.

More specifically, as shown in FIG. 33, whether an onset signal is received from each slot machine 10 is determined (S191). If received (S191, YES), the slot machine 10 which is the sender of the onset signal is specified (S192). Thereafter, with reference to the insurance bet management table shown in FIG. 28, the recording region of the insurance flag list associated with the machine number of the sender is changed to the on state (S193). Then the CPU of the external controller 200 ends the routine.

On the other hand, if the onset signal has not been received (S191, YES), whether an offset signal has been received is determined (S194). If not received (S194, NO), the CPU of the external controller 200 ends the routine. On the other hand, if received (S194, YES), the receiver of the offset signal is specified (S195). Thereafter, with reference to the insurance bet management table shown in FIG. 28, the recording region of the total game count list associated with the machine number of the sender is set to "0" (S196). Subsequently, after the recording region of the insurance flag list associated with the machine number of the sender is changed to the off state (S196), the CPU of the external controller 200 ends the routine.

The embodiments 1 and 2 deal with cases where the number of payline L is 25; however, the number of paylines is not limited in the present invention. For example, the number of paylines may be 30.

The embodiments 1 and 2 deal with cases where winning of bonus is achieved when three or more trigger symbols are rearranged. However, winning of bonus is not limited to this. For example, winning of bonus may be achieved when a predetermined time has elapsed since the last bonus game has ended.

Further, in the present embodiment, the free game is a game in which displaying of symbols on display blocks 28 are varied and stopped, and then a payout amount is determined according to the symbols having stopped or a combination of the stopped symbols (i.e. a game normally run in a slot machine). However, the free game of the present invention is not limited to this, and the free game may be different from a game run in a slot machine. Examples of the free game include: a card game such as poker, a shooting game, a fighting game, or the like. The free game may be a game that awards a game medium or a game awarding no game medium. Further, the following is also possible. Namely, a free game is run on condition that the number of base games counted during the insured mode reaches a predetermined number. Then, when the number of base games counted during the insured mode once again reaches a predetermined number, a free game which is different from the previous free game is run. The free game in the present invention may be suitably designed, and is not particularly limited, as long as the free game requires no bet of a game medium.

The above embodiments 1 and 2 thus described solely serve as specific examples of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

The present invention may be used in gaming machines in general such as those capable of executing a rescue process in which a payout, a bonus, or the like is awarded when a predetermined game repeat count or lost game repeat count is achieved.

What is claimed is:

1. A gaming machine comprising a symbol display device which rearranges plural symbols and a controller programmed to execute the steps of:

(a1) on condition that a game value is bet, running a base game in which the symbols are rearranged on the symbol display device and a base payout is awarded according to the rearranged symbols;

(a2) on condition that the symbols are rearranged in a predetermined condition in the base game, running a bonus game in which the symbols are rearranged with a condition in which a payout rate is higher than that of the base game and a bonus payout is awarded according to the rearranged symbols;

(a3) making an insurance bet automatically without an operation by a player for the insurance bet by using at least a part of the bonus payout awarded in the bonus game and setting insurance when the bonus payout has been awarded;

(a4) if the insurance has been set, determining whether a rescue start condition is established; and (a5) if the rescue start condition has been established, performing a rescue process; and, wherein insurance is not set in (a3) when the bonus payout has not been awarded.

2. The gaming machine according to claim 1, wherein, in the step (a2), a free game which does not require the betting of the game value is run as the bonus game.

3. The gaming machine according to claim 1, wherein, in the step (a3), the least bonus payout among bonus payouts awarded according to the symbols in the bonus game is used.

4. The gaming machine according to claim 1, wherein, in the step (a2), the bonus payout according to the symbols is awarded at once after the bonus game ends.

5. The gaming machine according to claim 1, wherein, in the step (a4), whether the rescue start condition has been established is determined according to whether the number of repetition of the base game has reached a predetermined number.

6. The gaming machine according to claim 1, wherein, in the step (a5), a free game which does not require the betting of the game value is run as the rescue process.

7. The gaming machine according to claim 6, wherein, in the step (a5), the free game is run with a game repeat count corresponding to an average bet amount until the rescue process is performed.

8. The gaming machine according to claim 6, wherein, in the step (a5), the free game is run with a payout amount corresponding to an average bet amount until the rescue process is performed.

9. A gaming machine comprising a symbol display device which rearranges plural symbols and a controller programmed to execute the steps of:

(b1) on condition that a game value is bet, running a base game in which the symbols are rearranged on the symbol display device and a base payout is awarded according to the rearranged symbols;

(b2) when the symbols are rearranged in a predetermined condition in the base game, running a bonus game in which a free game which does not require the betting of the game value is repeated plural times in accordance with a game repeat count, the symbols are rearranged in the free game, and a bonus payout corresponding to the rearranged symbols is awarded at once after the bonus game ends;

(b3) making an insurance bet automatically without an operation by a player for the insurance bet by using the lowest bonus payout among bonus payouts which are awarded in accordance with the symbols in the bonus game and setting insurance when the lowest bonus payout has been awarded;

(b4) if the insurance has been set, determining whether a rescue start condition has been established according to whether the number of repetition of the base game has reached a predetermined number; and (b5) if the rescue start condition has been established, performing a rescue process with at least one of game modes of a game repeat count and a payout amount corresponding to an average bet amount until the rescue process is performed; and, wherein insurance is not set when the lowest bonus payout has not been awarded.

10. A gaming method of a gaming machine, comprising the steps of:

on condition that a game value is bet, running a base game in which symbols are rearranged and a base payout is awarded according to the rearranged symbols;

on condition that the symbols are rearranged in a predetermined condition in the base game, running a bonus game in which the symbols are rearranged with a condition in which a payout rate is higher than that of the base game and a bonus payout is awarded according to the rearranged symbols;

making an insurance bet automatically without an operation by a player for the insurance bet by using at least a part of the bonus payout awarded in the bonus game and setting insurance when the bonus payout has been awarded;

if the insurance has been set, determining whether a rescue start condition is established; and if the rescue start condition has been established, performing a rescue process; and, wherein insurance is not set when the bonus payout has not been awarded.

* * * * *